US011482936B2

(12) United States Patent
Hsu et al.

(10) Patent No.: US 11,482,936 B2
(45) Date of Patent: Oct. 25, 2022

(54) SIGNAL TRANSMISSION CIRCUIT FOR PROVIDING CONTROL INFORMATION FROM SECONDARY SIDE TO PRIMARY SIDE OF POWER CONVERTER, AND CONTROL CIRCUIT FOR POWER CONVERTER

(71) Applicant: ALPHA AND OMEGA SEMICONDUCTOR INTERNATIONAL LP, Sunnyvale, CA (US)

(72) Inventors: Hung-Ta Hsu, Zhudong Township (TW); Hsiang-Chung Chang, Zhubei (TW); Yueh-Ping Yu, Zhubei (TW); Tien-Chi Lin, New Taipei (TW)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 230 days.

(21) Appl. No.: 16/862,579

(22) Filed: Apr. 30, 2020

(65) Prior Publication Data

US 2021/0344273 A1 Nov. 4, 2021

(51) Int. Cl.
*H02M 3/335* (2006.01)
*H02M 1/00* (2006.01)

(52) U.S. Cl.
CPC ......... *H02M 3/33523* (2013.01); *H02M 1/00* (2013.01); *H02M 1/0003* (2021.05); *H02M 3/335* (2013.01)

(58) Field of Classification Search
CPC .... H02M 3/33523; H02M 3/355; H02M 1/00; H02M 1/0003
See application file for complete search history.

(56) References Cited

U.S. PATENT DOCUMENTS

| 4,683,528 A | * | 7/1987 | Snow ................ H02M 3/33523 363/21.18 |
| 6,385,059 B1 | | 5/2002 | Telefus et al. |
| 9,489,001 B2 | | 11/2016 | Wang |
| 2015/0381049 A1 | | 12/2015 | Li |

FOREIGN PATENT DOCUMENTS

| JP | S5866576 A | 4/1983 |
| TW | I617126 B | 3/2018 |

* cited by examiner

*Primary Examiner* — Jue Zhang
(74) *Attorney, Agent, or Firm* — Chen-Chi Lin

(57) ABSTRACT

A signal transmission circuit is configured for transmitting control information from a secondary side of a power converter to a primary side of the power converter. The signal transmission circuit includes a transmitter circuit, a signal transformer and a detection circuit. The transmitter circuit is configured to generate a ramp signal at least according to a first control signal outputted from the secondary side. The first control signal indicates the control information provided for a switch in the primary side. The signal transformer, coupled to the transmitter circuit, is configured to convert the ramp signal to generate an output signal. The output signal includes a positive-going component and a negative-going component to indicate the control information. The detection circuit, coupled to the signal transformer, is configured to detect the positive-going component and the negative-going component to provide the control information for the switch.

21 Claims, 12 Drawing Sheets

SIGNAL TRANSMISSION CIRCUIT FOR PROVIDING CONTROL INFORMATION FROM SECONDARY SIDE TO PRIMARY SIDE OF POWER CONVERTER, AND CONTROL CIRCUIT FOR POWER CONVERTER

FIELD OF THE INVENTION

The present disclosure relates to control of power conversion and, more particularly, to a signal transmission circuit for providing control information for a switch in a primary-side circuit of a power converter, and a control circuit for a power converter.

BACKGROUND OF THE INVENTION

Control schemes of power converters include primary-side regulation and secondary-side regulation. Power converters utilizing the primary-side regulation have been widely adopted in low power applications, such as charger designs, since they can eliminate secondary-side feedback circuitry. However, the primary-side regulation lacks constant-voltage output accuracy required for high power applications. As the secondary-side regulation can directly sense the output voltage, power converters utilizing the secondary-side regulation are adopted to provide accurate constant-current and constant-voltage control. For example, power converters utilizing the secondary-side regulation can be applied in various applications which operate in a continuous conduction mode (CCM) or a discontinuous conduction mode (DCM).

SUMMARY OF THE INVENTION

A signal transmission circuit is disclosed for providing control information for a switch in a primary-side circuit of a power converter. A control circuit for a power converter is also disclosed.

In examples of the present disclosure, a signal transmission circuit is configured for transmitting control information from a secondary side of a power converter to a primary side of the power converter. The signal transmission circuit includes a transmitter circuit, a signal transformer and a detection circuit. The transmitter circuit is configured to generate a ramp signal at least according to a first control signal outputted from the secondary side. The first control signal indicates the control information provided for a switch in the primary side. The signal transformer, coupled to the transmitter circuit, is configured to convert the ramp signal to generate an output signal. The output signal includes a positive-going component and a negative-going component to indicate the control information. The detection circuit, coupled to the signal transformer, is configured to detect the positive-going component and the negative-going component to provide the control information for the switch.

In examples of the present disclosure, a control circuit includes a first control unit, a signal transmission circuit and a second control unit. The first control unit, coupled to a secondary-side circuit of the power converter, is configured to generate a first control signal comprising an on signal and a flag signal. The on signal indicates on-time information for a switch of a primary-side circuit of the power converter. The flag signal indicates whether a predetermined function of the power converter is activated. The signal transmission circuit, coupled to the first control unit, includes a transmitter circuit, a signal transformer and a detection circuit. The transmitter circuit is configured to generate a ramp signal according to the on signal and the flag signal. The signal transformer, coupled to the transmitter circuit, is configured to convert the ramp signal to generate an output signal. When the flag signal indicates that the predetermined function is not activated, the on signal is activated as the first control signal and the transmitter circuit is configured to generate the ramp signal according to the on signal, and the output signal includes a positive-going component and a negative-going component occurring one after the other. When the flag signal indicates that the predetermined function is activated, the flag signal is activated as the first control signal and the transmitter circuit is configured to generate the ramp signal according to the flag signal, and the output signal includes one of the positive-going component and the negative-going component consecutively occurring a plurality of times. The detection circuit, coupled to the signal transformer, is configured to detect the positive-going component and the negative-going component to generate a second control signal. The second control unit, coupled between the detection circuit and the switch, is configured to control the switch according to the second control signal.

BRIEF DESCRIPTION OF THE DRAWINGS

Various features may not be drawn to scale. The dimensions of the various features may be increased or reduced for clarity of discussion.

DETAILED DESCRIPTION OF THE INVENTION

Figure 1:
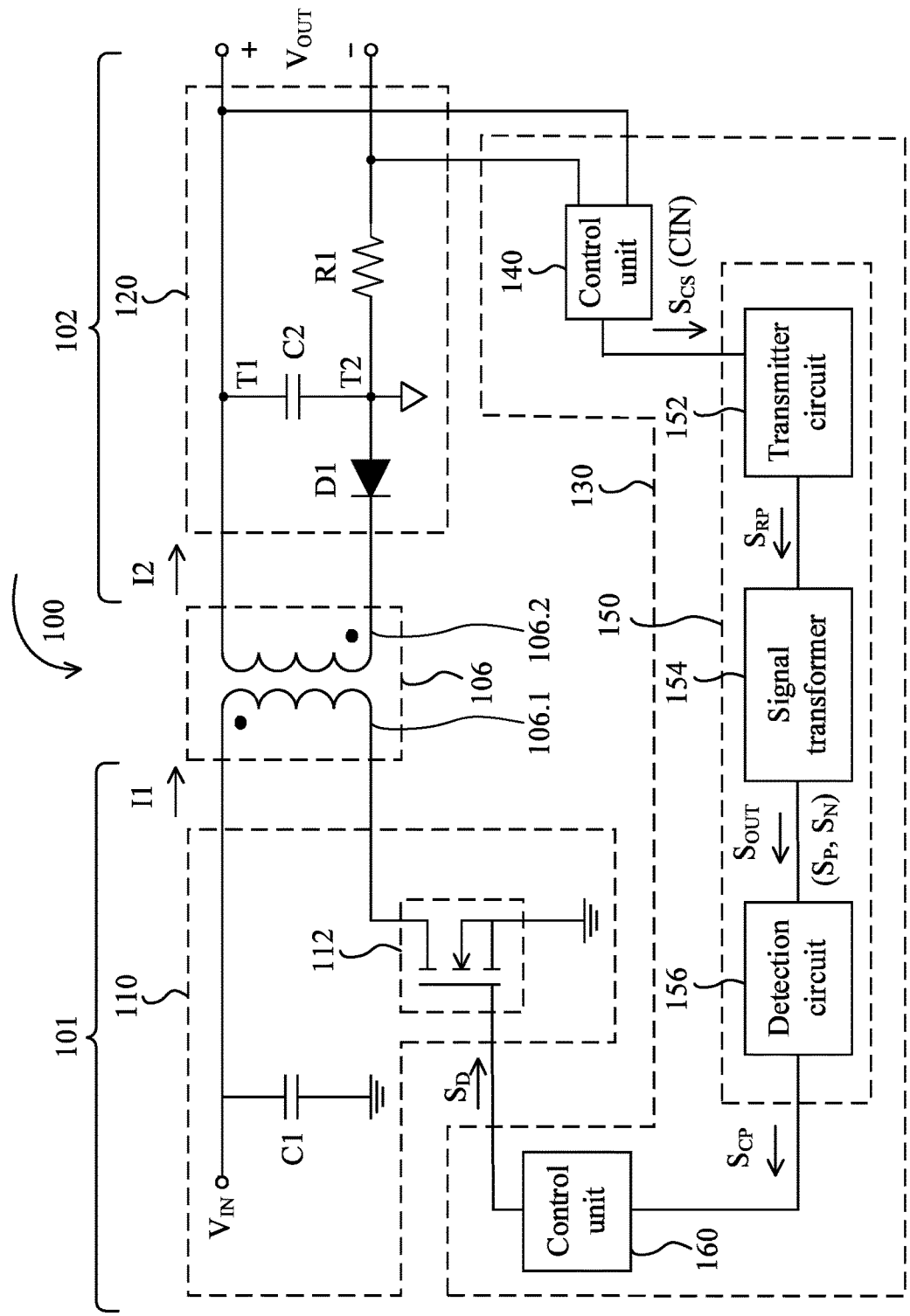
FIG. 1 illustrates an exemplary power converter in examples of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or intervening elements may be present. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

In a power converter utilizing secondary-side regulation, a control signal generated in a secondary side is sent to a primary side to thereby control switching operation in the primary side. The control signal can be implemented as a square voltage pulse. A signal transformer, disposed between the secondary side and the primary side, is arranged to sense the square voltage pulse generated in the secondary side. As an electromotive force (EMF) is induced across each winding of the signal transformer, the EMF induced in the primary side can be used for the switching operation. In order to increase duration of the EMF induced in the primary side, the signal transformer may be designed to have a large size such that a ramp rate of a current induced by the square voltage pulse can be reduced. However, the transformer size such as the wire size is expected to be reduced due to cost and volume considerations.

In addition, as the power converter may operate in a protection mode to ensure reliability and safety, the signal transformer may receive, from the secondary side, a control signal which carries a message indicating activation of the protection mode. However, the primary side may be unable to identify whether the control signal carries on-time information on switching operation or the message indicating activation of the protection mode. As a result, the control signal cannot enable the power converter to enter the protection mode instantaneously.

The present disclosure describes exemplary signal transmission circuits capable of transmitting a control signal from a secondary side to a primary side of a power converter by converting the control signal to an output signal including at least one of a positive-going component and a negative-going component. The exemplary signal transmission circuits can sense or identify control information carried in the control signal by detecting the positive-going component and the negative-going component. For example, the control information may indicate on-time information or an on-time duration of a switch disposed in the primary side. As another example, the control information may indicate activation of a predetermined function, such as a protection function performed in a protection mode. In some embodiments, the exemplary signal transmission circuits can utilize a current ramp pulse, or a fast current ramp pulse, to induce an EMF of sufficiently high level and wide pulse-width, thereby reducing a mutual inductance used in signal transmission. With the aid of the exemplary signal transmission circuits, a power converter utilizing secondary-side regulation can not only employ a signal transformer having a small mutual inductance, but also identify if control information carries a message indicating activation of a predetermined function such as a protection function. The present disclosure further describes exemplary control circuits used for power converters. Further description is provided below.

FIG. 1 illustrates an exemplary power converter in examples of the present disclosure. The power converter 100 is configured to convert an input voltage $V_{IN}$ to an output voltage $V_{OUT}$. The power converter 100 can be implemented as an AC/DC converter, a DC/DC converter or other types of converters. For example, the input voltage $V_{IN}$ can be outputted from a rectifier circuit (not shown in FIG. 1), which is configured to convert an AC voltage to produce a DC voltage, i.e. the input voltage $V_{IN}$. As another example, the input voltage $V_{IN}$ can be supplied by a DC power source. In the present embodiment, the power converter 100 may be implemented using a flyback converter topology for illustrative purposes. In some embodiments, the power converter 100 can implemented using other types of converter topologies without departing from the scope of the present disclosure.

The power converter 100 may include a transformer 106, a primary-side circuit 110, a secondary-side circuit 120 and a control circuit 130. The transformer 106 includes a primary winding 106.1 and a secondary winding 106.2. The secondary winding 106.2 is configured to output an output current I2 in response to an input current I1 flowing through the primary winding 106.1.

The primary-side circuit 110, coupled to the primary winding 106.1, is located in a primary side 101 of the power converter 100. The primary-side circuit 110 may include, but is not limited to, a capacitor C1 and a switch 112. The capacitor C1, coupled between the input voltage $V_{IN}$ and a reference voltage such as a ground voltage, is arranged to hold up the input voltage $V_{IN}$ and filter out common mode noise. For example, in some embodiments where the input voltage $V_{IN}$ is a rectified voltage outputted from a rectifier circuit included in the primary-side circuit 110 (not shown in FIG. 1), the capacitor C1 may be referred to as an input bulk capacitor, which is arranged to hold up the rectified voltage. The switch 112, coupled to the primary winding 106.1, is configured to control the input current I1 according to a drive signal $S_D$. In the present embodiment, the switch 112 can be implemented using a transistor, which can be selectively turned on according to the drive signal $S_D$.

The secondary-side circuit 120, coupled to the secondary winding 106.2, is located in a secondary side 102 of the power converter 100. The secondary-side circuit 120 is configured to generate the output voltage $V_{OUT}$ according to the output current I2. In the present embodiment, the secondary-side circuit 120 includes, but is not limited to, a capacitor C2, a diode D1 and a resistor R1. Two terminals T1 and T2 of the capacitor C2 are respectively coupled to an output of the secondary winding 106.2 and a reference voltage such as a ground voltage. The terminal T2 connected to the reference voltage is further coupled between the diode D1 and the resistor R1.

It is worth noting that the respective circuit structures of the primary-side circuit 110 and the secondary-side circuit 120 are provided for illustrative purposes, and are not intended to limit the scope of the present disclosure. In some embodiments, the primary-side circuit 110 may include other circuits such as a start-up circuit or a clamp circuit. In some embodiments, the diode D1 may be replaced with a switch controlled by the control circuit 130. Such associated modifications and alternatives fall within the contemplated scope of the present disclosure.

The control circuit 130, coupled between the primary-side circuit 110 and the secondary-side circuit 120, is configured to control the switch 112 in the primary side 101 according to control information provided from the secondary side 102. The control circuit 130 may include, but is not limited to, a control unit 140, a signal transmission circuit 150 and a control unit 160. In the present embodiment, the control unit 140 may be disposed in the secondary side 102, while the control unit 160 may be disposed in the primary side 101.

The control unit 140, coupled to the secondary-side circuit 120, is configured to generate a control signal $S_{CS}$ which indicates control information CIN for the switch 112. For example, the control unit 140 may generate the control signal $S_{CS}$ in response to the output voltage $V_{OUT}$, wherein the control information CIN carried by the control signal $S_{CS}$ may indicate an on-time duration of the switch 112 in a constant on time control scheme. As another example, the control unit 140 may generate the control signal $S_{CS}$ in response to a command signal (now shown in FIG. 1) which indicates activation of a predetermined function of the power converter 100. As a result, the control information CIN carried by the control signal $S_{CS}$ may indicate activation of the predetermined function. The predetermined function may include a protection function, a sequence function or other types of functions. The protection function may include, but is not limited to, under voltage lockout protection, short circuit protection, over voltage protection and over current protection. The sequence function may include, but is not limited to, a shutdown function, a soft start function and a power-good function.

The signal transmission circuit 150, coupled to the control unit 140, is configured to transmit the control information CIN from the secondary side 102 to the primary side 101. In the present embodiment, the signal transmission circuit 150 is configured to transmit the control signal $S_{CS}$ and accordingly generate a control signal $S_{CP}$ which can indicate the control information CIN. The signal transmission circuit 150 may include a transmitter circuit 152, a signal transformer 154 and a detection circuit 156. The transmitter circuit 152 is configured to generate a ramp signal $S_{RP}$ according to the control signal $S_{CS}$. In some embodiments, the ramp signal $S_{RP}$ may be implemented as a single-ended ramp signal outputted from one output terminal of the transmitter circuit 152. In some embodiments, the ramp signal $S_{RP}$ may be implemented to include one or more ramp pulses, such as one or more current ramp pulses, outputted from a pair of output terminals of the transmitter circuit 152.

The signal transformer 154, coupled to the transmitter circuit 152, is configured to convert the ramp signal $S_{RP}$ to generate an output signal $S_{OUT}$, which may include a positive-going component $S_P$ and a negative-going component $S_N$ to indicate the control information CIN. The positive-going component $S_P$ may be a positive-going pulse such as a positive-going ramp pulse. The negative-going component $S_N$ may be a negative-going pulse such as a negative-going ramp pulse. In some embodiments, the signal transformer 154 can be implemented to include a transformer having a primary winding and a secondary winding, respectively coupled to the transmitter circuit 152 and the detection circuit 156. When the ramp signal $S_{RP}$ outputted from the transmitter circuit 152 has a sufficiently high ramp rate, the output signal $S_{OUT}$ induced at an output side of the signal transformer 154 can have a sufficiently high level and wide pulse-width, thereby reducing a mutual inductance used in the signal transformer 154 to the order of nano-Henry (nH) without sacrificing the accuracy of the control information CIN transmission. In one embodiment, the current ramp rate is about 2 mA/ns to 4 mA/ns, the signal transformer with a mutual inductance of about 50 nH may induce an EMF within a range between 100 mV and 200 mV to provide accurate transmission of the control information CIN. Compared to traditional approach where a signal transformer with a mutual inductance of micro Henry (uH) or higher must be used, this invention provides the advantage of using a much small and light-weight signal transformer therefore is more suitable for mobile applications.

The detection circuit 156, coupled to the signal transformer 154, is configured to detect the positive-going component $S_P$ and the negative-going component $S_N$ to provide the control information CIN for the switch 112. In the present embodiment, the detection circuit 156 may detect the positive-going component $S_P$ and the negative-going component $S_N$ to thereby generate the control signal $S_{CP}$ indicating the control information CIN according to predetermined sequence patterns of the positive-going component $S_P$ and the negative-going component $S_N$.

The control unit 160, coupled between the detection circuit 156 and the switch 112, is configured to control the switch 112 according to the control signal $S_{CP}$. In the present embodiment, the control unit 160 may generate the drive signal $S_D$ according to the control signal $S_{CP}$, thereby controlling switching operation of the switch 112.

In operation, when the control information CIN carried by the control signal $S_{CS}$ is an on signal ($S_{ON}$) indicating an on-time duration of the switch 112, the signal transformer 154 may output the positive-going component $S_P$ and the negative-going component $S_N$ one after the other with a delay indicating the on-time duration. When it is detected that the positive-going component $S_P$ and the negative-going component $S_N$ are generated one after the other, the detection circuit 156 is configured to generate a first portion of the control signal $S_{CP}$ in response to a first detected output signal $S_{OUT}$ that is one of the positive-going component $S_P$ and the negative-going component $S_N$, to turn on the switch 112, and to generate a second portion of the control signal $S_{CP}$ in response to a second detected output signal $S_{OUT}$ that is the other of the positive-going component $S_P$ and the negative-going component $S_N$, to turn off the switch 112. By way of example but not limitation, the first portion and the second portion of the control signal $S_{CP}$ may be a rising portion and a falling portion thereof, respectively. In one example, a first $S_P$ is followed by a second $S_N$. In another example, a first $S_N$ is followed by a second $S_P$.

When the control information CIN carried by the control signal $S_{CS}$ is a flag signal ($S_{FLAG}$) indicating activation of a predetermined function of the power converter 100, the signal transformer 154 may repeatedly output one of the positive-going component $S_P$ and the negative-going component $S_N$. The detection circuit 156 is configured to generate the control signal $S_{CP}$ to activate the predetermined function if the one of the positive-going component $S_P$ and the negative-going component $S_N$ is outputted a predetermined number of consecutive times. When it is detected that the one of the positive-going component $S_P$ and the negative-going component $S_N$ is outputted the predetermined number of consecutive times, the detection circuit 156 is configured to generate the control signal $S_{CP}$ to enable the switch 112 to perform the predetermined function.

In some embodiments, a frequency of the repeatedly generated signal component, i.e. one of the positive-going component $S_P$ and the negative-going component $S_N$, may be modulated to transmit the control information CIN rapidly. For example, the transmitter circuit 152 may be configured to modulate a frequency of the ramp signal $S_{RP}$ according to different operating scenarios. When control information CIN carried by the control signal $S_{CS}$ indicates activation of a predetermined function of the power converter 100, the transmitter circuit 152 may increase the frequency of the ramp signal $S_{RP}$, such that the signal transformer 154 can repeatedly output the one of the positive-going component $S_P$ and the negative-going component $S_N$ at a high frequency.

It is worth noting that when one of the positive-going component $S_P$ and the negative-going component $S_N$ is used to enable a turn-on operation of the switch 112, the other of the positive-going component $S_P$ and the negative-going component $S_N$ can be used not only to enable a turn-off operation of the switch 112, but also to enable the switch 112 to perform a predetermined function. For example, in some embodiments where the positive-going component $S_P$ is used to enable a turn-on operation of the switch 112, the negative-going component $S_N$ can be used to enable a turn-off operation of the switch 112 when outputted to the detection circuit 156 immediately after the positive-going component $S_P$. In addition, when the detection circuit 156 detects that the negative-going component $S_N$ is outputted a predetermined number of consecutive times, the negative-going component $S_N$ can also be used to enable the switch 112 to perform a predetermined function. As another example, in some embodiments where the negative-going component $S_N$ is used to enable a turn-on operation of the switch 112, the positive-going component $S_P$ can be used to enable a turn-off operation of the switch 112 when outputted to the detection circuit 156 immediately after the negative-going component $S_N$. When the detection circuit 156 detects that the positive-going component $S_P$ is outputted a predetermined number of consecutive times, the positive-going component $S_P$ can also be used to enable the switch 112 to perform a predetermined function.

With the aid of the proposed signal transmission scheme, the power converter 100 can not only employ a signal transformer having a small mutual inductance for signal transmission between the secondary side 102 and the primary side 101, but also successfully identify the control information CIN provided from the secondary side 102.

Figure 2:
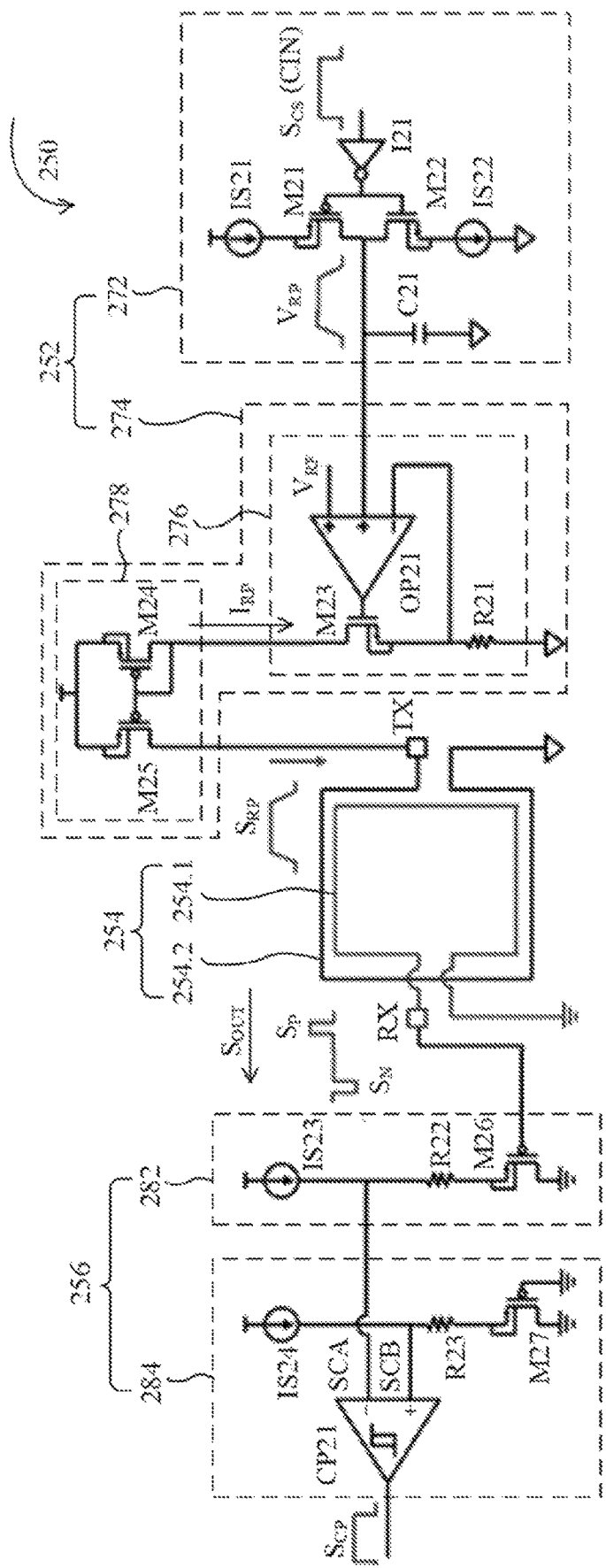
FIG. 2 illustrates an implementation of at least a portion of the signal transmission circuit shown in FIG. 1 in examples of the present disclosure.

FIG. 2 illustrates an implementation of at least a portion of the signal transmission circuit 150 shown in FIG. 1 in examples of the present disclosure. In the present embodiment, the control information CIN may be on-time information, which can indicate an on-time duration of the switch 112 shown in FIG. 1. The signal transmission circuit 250 can be configured to transmit the on-time information carried by the control signal $S_{CS}$ from the secondary side 102 to the primary side 101 shown in FIG. 1.

The signal transmission circuit 250 may include a transmitter circuit 252, a signal transformer 254 and a detection circuit 256, which can be embodiments of the transmitter circuit 152, the signal transformer 154 and the detection circuit 156 shown in FIG. 1, respectively. The transmitter circuit 252 includes, but is not limited to, a pre-driver circuit 272 and a driver circuit 274. The pre-driver circuit 272 can be configured to receive the control signal $S_{CS}$, e.g. an on signal ($S_{ON}$) of a rectangular voltage pulse, to generate a drive signal $V_{RP}$, which is a voltage signal having a ramp-up portion and a ramp-down portion. By way of example but not limitation, the pre-driver circuit 272 may include an inverter 121, a current source IS21, a current sink IS22, a transistor M21, a transistor M22 and a capacitor C21. An input terminal of the inverter 121 is configured to receive the control signal $S_{CS}$. An output terminal of the inverter 121 is coupled to respective control terminals of the transistors M21 and M22, e.g. gate terminals. One terminal of the capacitor C21 is coupled between the transistors M21 and M22. The other terminal of the capacitor C21 is coupled to a reference voltage such as a ground voltage. The capacitor C21 is arranged to hold up the drive signal $V_{RP}$. A ramp rate of the drive signal $V_{RP}$, e.g. a ramp-up rate or a ramp-down rate, can be adjusted according to one or more circuit elements of the pre-driver circuit 272. For example, the ramp rate of the drive signal $V_{RP}$ can be adjusted according to at least one of respective sizes of the inverter 121, the transistor M21, the transistor M22 and the capacitor C21.

The driver circuit 274 can be configured to receive the drive signal $V_{RP}$ to output the ramp signal $S_{RP}$ from the output terminal TX. In the present embodiment, the driver circuit 274 can be implemented as a transconductance circuit which is configured to convert a voltage signal to a current signal. As a result, the ramp signal $S_{RP}$ may be a current signal such as a ramp current. The driver circuit 274 may include, but is not limited to, a transconductance stage 276 and a current mirror stage 278. The transconductance stage 276 is configured to convert the drive signal $V_{RP}$ to a current signal $I_{RP}$, e.g. a ramp current. The transconductance stage 276 may include an amplifier OP21, a transistor M23 and a resistor R21. The amplifier OP21 includes three input terminals, which are coupled to a reference signal $V_{RF}$, the drive signal $V_{RP}$ and the resistor R21, respectively. The amplifier OP21 is configured to control a switching operation of the transistor M23, thereby allowing the current signal $I_{RP}$ to flow through the transistor M23 and the resistor R21. The current mirror stage 278 is configured to output the ramp signal $S_{RP}$ from the output terminal TX according to the current signal $I_{RP}$. In the present embodiment, the current mirror stage 278 can be implemented to include a plurality of transistors M24 and M25.

The signal transformer 254 may include a plurality of coil portions 254.1 and 254.2. When the ramp signal $S_{RP}$ flows through the coil portion 254.1, the coil portion 254.2 can induce an output signal $S_{OUT}$, e.g. a voltage signal, at an input terminal RX of the detection circuit 256. The output signal $S_{OUT}$ can be an embodiment of the output signal $S_{OUT}$ shown in FIG. 1. Depending on arrangement of the coil portions 254.1 and 254.2, a ramp-up portion of the ramp signal $S_{RP}$ can induce one of the positive-going component $S_P$ and the negative-going component $S_N$ of the output signal $S_{OUT}$, and a ramp-down portion of the ramp signal $S_{RP}$ can induce the other of the positive-going component $S_P$ of the negative-going component $S_N$. In the present embodiment, the ramp-up portion and the ramp-down portion of the ramp signal $S_{RP}$ can induce the negative-going component $S_N$ and the positive-going component $S_P$, respectively.

The detection circuit 256 is configured to receive the positive-going component $S_P$ and the negative-going component $S_N$ to output the control signal $S_{CP}$. The detection circuit 256 may include an amplifier circuit 282 and a comparison circuit 284. The amplifier circuit 282 is configured to amplify the output signal $S_{OUT}$ to generate an amplified signal SCA. In the present embodiment, the amplifier circuit 282 can be implemented as a common drain amplifier or a source follower, which includes a current source IS23, a resistor R22 and a transistor M26.

The comparison circuit 284, coupled to the amplifier circuit 282, is configured to compare the amplified signal SCA with a reference signal SCB to determine if the positive-going component $S_P$ or the negative-going component $S_N$ is received. When a signal level of the amplified signal SCA is greater than a signal level of the reference signal SCB, it is determined that one of the positive-going component $S_P$ and the negative-going component $S_N$ is received. When the signal level of the amplified signal SCA is less than the signal level of the reference signal SCB, it is determined that the other of the positive-going component $S_P$ and the negative-going component $S_N$ is received. In the present embodiment, the comparison circuit 284 may include a comparator CP21, a current source IS24, a resistor R23 and a transistor M27. An inverting terminal of the comparator CP21 is arranged to receive the amplified signal SCA. A non-inverting terminal of the comparator CP21 is arranged to receive the reference signal SCB, which is established owing to a current flowing from the current source IS24 to the resistor R23 and the transistor M27.

In operation, when the control signal $S_{CS}$ includes a rising portion and a falling portion to define the on-time duration of the switch 112, the transmitter circuit 252 can generate the ramp signal $S_{RP}$ having a ramp-up portion and a ramp-down portion. The signal transformer 254 can output the negative-going component $S_N$ and the positive-going component $S_P$ of the output signal $S_{OUT}$ in response to the ramp-up portion and the ramp-down portion, respectively. When the negative-going component $S_N$ of the output signal $S_{OUT}$ is outputted to the transistor M26, the signal level of the amplified signal SCA would be less than the signal level of the reference signal SCB. The comparator CP21 can be configured to generate a rising portion of the control signal $S_{CP}$. When the positive-going component $S_P$ of the output signal $S_{OUT}$ is outputted to the transistor M26, the signal level of the amplified signal SCA would be greater than the signal level of the reference signal SCB. The comparator CP21 can be configured to generate a falling portion of the control signal $S_{CP}$. Delay between the rising portion and the falling portion of the control signal $S_{CP}$ can indicate the on-time duration of the switch 112. As a result, the on-time information carried by the control signal $S_{CS}$ can be transmitted from the secondary side 102 to the primary side 101 shown in FIG. 1.

It is worth noting that the ramp signal $S_{RP}$ inputted to the coil portion 254.1 can be a fast current ramp pulse of a high magnitude. As a result, an EMF induced by the coil portion 254.2 can have a sufficiently high level and wide pulse-width, thereby reducing a mutual inductance used in the signal transformer 254. For example, the drive signal $V_{RP}$ can have a sufficiently high ramp rate such that the output signal $S_{RP}$ can be implemented as a fast current ramp pulse of a high magnitude.

Figure 3:
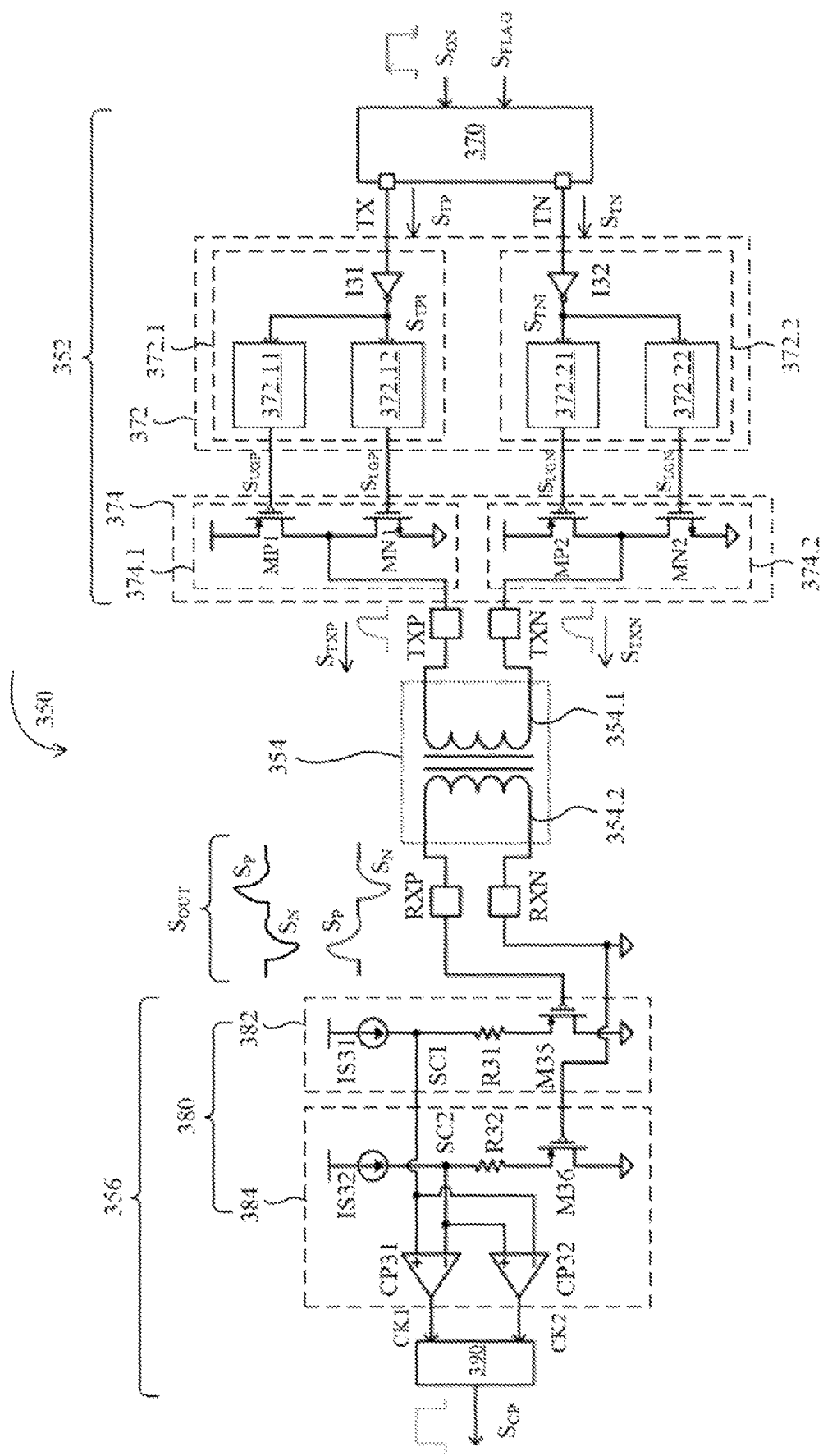
FIG. 3 illustrates another implementation of at least a portion of the signal transmission circuit shown in FIG. 1 in examples of the present disclosure.

FIG. 3 illustrates another implementation of at least a portion of the signal transmission circuit 150 shown in FIG. 1 in examples of the present disclosure. In the present embodiment, the signal transmission circuit 350 can be configured to transmit control information indicating an on-time duration of the switch 112 shown in FIG. 1, or control information indicating whether to activate a predetermined function of the power converter 100 shown in FIG. 1. For example, the signal transmission circuit 350 can be configured to transmit a control signal $S_{ON}$, which carries the control information indicating the on-time duration of the switch 112 shown in FIG. 1. As another example, the signal transmission circuit 350 can be configured to transmit a control signal $S_{FLAG}$, which carries the control information indicating activation of the predetermined function of the power converter 100 shown in FIG. 1. Each of the control signals $S_{ON}$ and $S_{FLAG}$ can be an embodiment of the control signal $S_{CS}$ shown in FIG. 1.

The signal transmission circuit 350 may include a transmitter circuit 352, a signal transformer 354 and a detection circuit 356, which can be embodiments of the transmitter circuit 152, the signal transformer 154 and the detection circuit 156 shown in FIG. 1, respectively. The transmitter circuit 352 can be configured to output a plurality of ramp pulses $S_{TXP}$ and $S_{TXN}$ as the ramp signal $S_{RP}$ according to the control signal $S_{ON}$. Additionally, or alternatively, the transmitter circuit 352 can be configured to repeatedly outputting one of the ramp pulses $S_{TXP}$ and $S_{TXN}$ as the ramp signal $S_{RP}$ according to the control signal $S_{FLAG}$. Each of the ramp pulses $S_{TXP}$ and $S_{TXN}$ may be, but is not limited to, a current ramp pulse or a fast current ramp pulse. By way of example but not limitation, when the control signal $S_{FLAG}$ indicates that the predetermined function is not activated, the transmitter circuit 352 is configured to transmit the control signal $S_{ON}$ to output the ramp pulses $S_{TXP}$ and $S_{TXN}$ one immediately after the other. When the control signal $S_{FLAG}$ indicates that the predetermined function is activated, the transmitter circuit 352 is configured to transmit the control signal $S_{FLAG}$, rather than the control signal $S_{ON}$, to repeatedly outputting one of the ramp pulses $S_{TXP}$ and $S_{TXN}$.

In some embodiments, when transmitter circuit 352 is configured to output the ramp pulses $S_{TXP}$ and $S_{TXN}$ as the ramp signal $S_{RP}$ according to the control signal $S_{ON}$, one of the ramp pulses $S_{TXP}$ and $S_{TXN}$ can indicate a turn-on operation, and the other of the ramp pulses $S_{TXP}$ and $S_{TXN}$ can indicate a turn-off operation. By way of example but not limitation, the on-time duration of the switch 112 shown in FIG. 1 may be determined according to a rising portion and a falling portion of the control signal $S_{ON}$. The transmitter circuit 352 can be configured to output the ramp pulse $S_{TXP}$ from an output terminal TXP in response to one of the rising portion and the falling portion of the control signal $S_{ON}$, and output the ramp pulse $S_{TXN}$ from an output terminal TXN in response to the other of the rising portion and the falling portion of the control signal $S_{ON}$. In some embodiments, when the transmitter circuit 352 is configured to repeatedly outputting one of the ramp pulses $S_{TXP}$ and $S_{TXN}$ as the ramp signal $S_{RP}$ according to the control signal $S_{FLAG}$, the one of the ramp pulses $S_{TXP}$ and $S_{TXN}$ may be a ramp pulse corresponding to a turn-off operation of the switch 112 shown in FIG. 1.

The transmitter circuit 352 includes, but is not limited to, an input signal generator 370, a pre-drive stage 372 and a drive stage 374. The input signal generator 370 is configured to generate at least one input signal to in response to the control signal $S_{ON}$ and the control signal $S_{FLAG}$. By way of example but not limitation, when the transmitter circuit 352 is configured to transmit the control signal $S_{ON}$, the input signal generator 370 is configured to generate a plurality of input signals $S_{TP}$ and $S_{TN}$ in response to the control signal $S_{ON}$. When the transmitter circuit 352 is configured to transmit the control signal $S_{FLAG}$, the input signal generator 370 is configured to generate one of the input signals $S_{TP}$ and $S_{TN}$. In the present embodiment, input signals $S_{TP}$ and $S_{TN}$ may be outputted from a plurality of output terminals TP and TN, respectively The pre-drive stage 372, coupled to the input signal generator 370, is configured to generate a plurality of drive signals $S_{UGP}$, $S_{LGP}$, $S_{UGN}$ and $S_{LGN}$ according to the input signals $S_{TP}$ and $S_{TN}$. In some embodiments, the drive signals $S_{UGP}$ and $S_{LGP}$ may be complementary to each other. Additionally, or alternatively, the drive signals $S_{UGN}$ and $S_{LGN}$ may be complementary to each other. In the present embodiment, the pre-drive stage 372 may include a plurality of pre-driver circuits 372.1 and 372.2. The pre-driver circuit 372.1 is configured to generate the drive signals $S_{UGP}$ and $S_{LGP}$ according to the input signal $S_{TP}$. The pre-driver circuit 372.2 is configured to generate the drive signals $S_{UGN}$ and $S_{LGN}$ according to the input signal $S_{TN}$.

In some embodiments, at least one of respective slew rates of the drive signals $S_{UGP}$, $S_{LGP}$, $S_{UGN}$ and $S_{LGN}$ can be adjusted. For example, the pre-driver circuit 372.1 may include an inverter 131, a pre-driver 372.11 and a pre-driver 372.12. The inverter 131 is configured to invert the input signal $S_{TP}$ to generate an inverted signal $S_{TPI}$. The pre-drivers 372.11 and 372.12 are configured to generate the drive signals $S_{UGP}$ and $S_{LGP}$ according to the inverted signal $S_{TPI}$, respectively. The pre-driver circuit 372.2 may include an inverter 132, a pre-driver 372.21 and a pre-driver 372.22. The inverter 132 is configured to invert the input signal $S_{TN}$ to generate an inverted signal $S_{TNI}$. The pre-drivers 372.21 and 372.22 are configured to generate the drive signals $S_{UGN}$ and $S_{LGN}$ according to the inverted signal $S_{TNI}$, respectively. At least one of the pre-drivers 372.1-372.4 is capable of adjusting a slew rate of a corresponding drive signal.

The driver stage 374 can be configured to output the ramp signal $S_{RP}$ according to the drive signals $S_{UGP}$, $S_{LGP}$, $S_{UGN}$ and $S_{LGN}$. The driver stage 374 includes, but is not limited to, a plurality of driver circuits 374.1 and 374.2. The driver circuit 374.1 is configured to output the ramp pulse $S_{TXP}$ from the output terminal TXP according to the drive signals $S_{UGP}$ and $S_{LGP}$. In the present embodiment, the driver 374.1 may include a pull-up transistor MP1 and a pull-down transistor MN1 coupled in series. The pull-up transistor MP1 is selectively turned on according to the drive signal $S_{UGP}$, and the pull-up transistor MN1 is selectively turned on according to the drive signal $S_{LGP}$. The pre-driver circuit 372.1 can control the pull-up transistor MP1 and the pull-down transistor MN1 to output a current ramp pulse by turning on the pull-up transistor MP1 and the pull-down transistor MN1 in sequence according to the input signal $S_{TP}$. The current ramp pulse can be outputted from the output terminal TXP, which is coupled between the pull-up transistor MP1 and the pull-down transistor MN1, to serve as the ramp pulse $S_{TXP}$.

Similarly, the driver 374.2 may include a pull-up transistor MP2 and a pull-down transistor MN2 coupled in series. The pull-up transistor MP2 is selectively turned on according to the drive signal $S_{UGN}$, and the pull-up transistor MN2 is selectively turned on according to the drive signal $S_{LGN}$. The pre-driver circuit 372.2 can control the pull-up transistor MP2 and the pull-down transistor MN2 to output a current ramp pulse by turning on the pull-up transistor MP2 and the pull-down transistor MN2 in sequence according to the input signal $S_{TN}$. The current ramp pulse can be outputted from the output terminal TXN, which is coupled between the pull-up transistor MP2 and the pull-down transistor MN2, to serve as the ramp pulse $S_{TXN}$.

In some embodiments, a ramp rate and a magnitude of the ramp pulse $S_{TXP}/S_{TXN}$ can be adjusted according to at least one of a waveform of the drive signal $S_{UGP}/S_{LGP}$ and a size of the transistor MP1/MP2. The ramp pulse $S_{TXP}/S_{TXN}$ can be a fast current ramp pulse of a high magnitude. For example, the pre-driver 372.11 can rapidly turn on the transistor MP1 by adjusting the waveform of the drive signal $S_{UGP}$, e.g. increasing a slew rate of the drive signal $S_{UGP}$. As another example, the pre-driver 372.21 can rapidly turn on the transistor MP2 by adjusting the waveform of the drive signal $S_{UGN}$, e.g. increasing a slew rate of the drive signal $S_{UGN}$.

The signal transformer 354 can be configured to convert the ramp pulse $S_{TXP}$ to generate one of the positive-going component $S_P$ and the negative-going component $S_N$, and convert the ramp pulse $S_{TXN}$ to generate the other of the positive-going component $S_P$ and the negative-going component $S_N$. For example, when the ramp pulses $S_{TXP}$ and $S_{TXN}$ are outputted to the signal transformer 354 one immediately after the other, the signal transformer 354 may generate the positive-going component $S_P$ and the negative-going component $S_N$ one after the other. As another example, when one of the ramp pulses $S_{TXP}$ and $S_{TXN}$ is repeatedly outputted to the signal transformer 354, the signal transformer 354 may repeatedly generate one of the positive-going component $S_P$ and the negative-going component $S_N$.

In the present embodiment, the signal transformer 354 may include a plurality of windings 354.1 and 354.2. One end of the winding 354.1 is arranged to receive the ramp pulse $S_{TXP}$, and the other end of the winding 354.1 is arranged to receive the ramp pulse $S_{TXN}$. One end of the winding 354.2 is arranged to output the output signal $S_{OUT}$, and the other end of the winding 354.2 is coupled to a reference voltage such as a ground voltage. For example, the winding 354.1 is coupled between the output terminals TXP and TXN. The winding 354.2 is coupled between input terminals RXP and RXN of the detection circuit 356. When the ramp pulse $S_{TXP}$ and the ramp pulse $S_{TXN}$ are outputted to the signal transformer 354 in sequence, the signal transformer 354 may output the positive-going component $S_P$ and the negative-going component $S_N$ to the input terminal RXP in sequence. When the ramp pulse $S_{TXN}$ and the ramp pulse $S_{TXP}$ are outputted to the signal transformer 354 in sequence, the signal transformer 354 may output the negative-going component $S_N$ and the positive-going component $S_P$ to the input terminal RXP in sequence.

It is worth noting that as each of the ramp pulses $S_{TXP}$ and $S_{TXN}$ inputted to the winding 354.1 can be a fast current ramp pulse of a high magnitude, an EMF induced by the winding 354.2 can have a sufficiently high level and wide pulse-width, thereby reducing a mutual inductance used in the signal transformer 354.

The detection circuit 356 is configured to receive the positive-going component $S_P$ and the negative-going component $S_N$ to output the control signal $S_{CP}$. The detection circuit 356 may include a receiver circuit 380 and a processing circuit 390. The receiver circuit 380, coupled to the signal transformer 354, can be configured to receive the positive-going component $S_P$ and the negative-going component $S_N$ to output a plurality of detection signals CK1 and CK2. For example, when the positive-going component $S_P$ is detected on the input terminal RXP, the receiver circuit 380 may output one of the detection signals CK1 and CK2. When the negative-going component $S_N$ is detected on the input terminal RXP, the receiver circuit 380 may output the other of the detection signals CK1 and CK2.

In the present embodiment, the receiver circuit 380 may include an amplifier circuit 382 and a comparison circuit 384. The amplifier circuit 382 is configured to amplify the output signal $S_{OUT}$ to generate an amplified signal SC1. In the present embodiment, the amplifier circuit 382 can be implemented as a common drain amplifier, which includes a current source IS31, a resistor R31 and a transistor M35.

The comparison circuit 384, coupled to the amplifier circuit 382, is configured to compare the amplified signal SC1 with a reference signal SC2 to determine if the positive-going component $S_P$ or the negative-going component $S_N$ is received. When a signal level of the amplified signal SC1 is greater than a signal level of the reference signal SC2, it is determined that one of the positive-going component $S_P$ and the negative-going component $S_N$ is received. When the signal level of the amplified signal SC1 is less than the signal level of the reference signal SC2, it is determined that the other of the positive-going component $S_P$ and the negative-going component $S_N$ is received.

In the present embodiment, the comparison circuit 384 may include a current source IS32, a resistor R32, a transistor M36, and a plurality of comparators CP31 and CP32. The transistor M36 is turned on to allow a current outputted from the current source IS32 to flow through the resistor R32 and the transistor M36, thereby providing the reference signal SC2 for each of the comparators CP31 and CP32. A non-inverting terminal of the comparator CP31 is coupled to the amplified signal SC1, and an inverting terminal of the comparator CP31 is coupled to the reference signal SC2. A non-inverting terminal of the comparator CP32 is coupled to the reference signal SC2, and an inverting terminal of the comparator CP32 is coupled to the amplified signal SC1. When the signal level of the amplified signal SC1 is greater than the signal level of the reference signal SC2, an output terminal of the comparator CP31 can be arranged to output the detection signal CK1. When the signal level of the amplified signal SC1 is less than the signal level of the reference signal SC2, an output terminal of the comparator CP32 can be arranged to output the detection signal CK2.

The processing circuit 390, coupled to the receiver circuit 380, can be configured to generate the control signal $S_{CP}$ according to at least one of the detection signals CK1 and CK2. For example, when the detection signals CK1 and CK2 are outputted one after the other, the processing circuit 390 can be configured to generate the control signal $S_{CP}$ according to the detection signals CK1 and CK2. In one example, the detection signal CK1 is followed by CK2. In another example, the detection signal CK2 is followed by CK1. The control signal $S_{CP}$ can indicate the on-time duration of the switch 112 shown in FIG. 1, which is defined by a time delay between the detection signals CK1 and CK2. As another example, when one of the detection signals CK1 and CK2 is outputted a predetermined number of consecutive times, the processing circuit 390 can be configured to generate the control signal $S_{CP}$ to enable the switch 112 shown in FIG. 1 to perform a predetermined function.

In operation, the input signal generator 370 can generate the input signal $S_{TP}$ and the input signal $S_{TN}$ in response to a rising portion and a falling portion of the control signal $S_{ON}$, respectively. The rising portion and the falling portion can indicate a turn-on operation and a turn-off operation of the switch 112 shown in FIG. 1, respectively. The driver stage 374 may output the ramp pulses $S_{TXP}$ and $S_{TXN}$ in sequence. The signal transformer 354 may output the positive-going component $S_P$ and the negative-going component $S_N$ in sequence. The positive-going component $S_P$ and the negative-going component $S_N$ may correspond to the turn-on operation and the turn-off operation of the switch 112 shown in FIG. 1, respectively.

In addition, the receiver circuit 380 may generate the detection signals CK1 and CK2 in response to the positive-going component $S_P$ and the negative-going component $S_N$, respectively. For example, when the positive-going component $S_P$ is inputted to the input terminal RXP, a signal level of the amplified signal SC1 would increase since a signal level at a gate terminal of the transistor M35 would increase. As a result, the comparator CP31 can generate the detection signal CK1 to indicate that the positive-going component $S_P$ is detected. When the negative-going component $S_N$ is inputted to the input terminal RXP, the signal level of the amplified signal SC1 would decrease since the signal level at the gate terminal of the transistor M35 would decrease. The comparator CP32 can generate the detection signal CK2 to indicate that the negative-going component $S_N$ is detected. The processing circuit 390 may receive the detection signals CK1 and CK2 in sequence to generate the control signal $S_{CP}$, which can indicate on-time information carried by the control signal $S_{ON}$.

When the control signal $S_{FLAG}$ indicating activation of a predetermined function is received, the input signal generator 370 can generate the input signal $S_{TN}$ to thereby enable the pre-driver circuit 372.2 to generate the drive signals $S_{UGN}$ and $S_{LGN}$. The driver circuit 374.2 may repeatedly output the ramp pulse $S_{TXN}$ according to the drive signals $S_{UGN}$ and $S_{LGN}$. The signal transformer 354 may receive the ramp pulse $S_{TXN}$ to repeatedly output the negative-going component $S_N$ from the input terminal RXP. The receiver circuit 380 may output the detection signal CK2 each time the negative-going component $S_N$ is received. Next, the processing circuit 390 may determine if the detection signal CK2 is generated a predetermined number of consecutive times. When it is determined that the detection signal CK2 is generated the predetermined number of consecutive times, the processing circuit 390 may generate the control signal $S_{CP}$, which can be used to enable the switch 112 shown in FIG. 1 to perform the predetermined function.

It is worth noting that the circuit topology and operation described above are provided for illustrative purposes, and are not intended to limit the scope of the present disclosure. In some embodiments, the transmitter circuit 352 can be implemented using other circuit topologies. By way of example but not limitation, the pre-driver circuit 372.1 and the driver circuit 374.1 may be replaced with the pre-driver circuit 272 and the driver circuit 274 shown in FIG. 2, respectively. Additionally, or alternatively, the pre-driver circuit 372.2 and the driver circuit 374.2 may be replaced with the pre-driver circuit 272 and the driver circuit 274 shown in FIG. 2, respectively. Various modifications and variations can be made to a transmitter circuit as long as one or more ramp pulses carrying control information provided from a secondary-side circuit can be generated therefrom.

In some embodiments, the positive-going component $S_P$ and the negative-going component $S_N$ may correspond to the turn-off operation and the turn-on operation of the switch 112 shown in FIG. 1, respectively. For example, when the transmitter circuit 352 is configured to transmit the control signal $S_{ON}$, the input signal generator 370 may generate the input signal $S_{TN}$ and the input signal $S_{TP}$ in response to the rising portion and the falling portion of the control signal $S_{ON}$, respectively. The driver stage 374 may output the ramp pulses STAN and $S_{TXP}$ in sequence. The signal transformer 354 may output the negative-going component $S_N$ and the positive-going component $S_P$ in sequence. As a result, the comparator CP32 can generate the detection signal CK2 before the comparator CP31 generates the detection signal CK1. The processing circuit 390 may receive the detection signals CK2 and CK1 in sequence to generate the control signal $S_{CP}$, which indicates on-time information carried by the control signal $S_{ON}$.

Additionally, or alternatively, when the control signal $S_{FLAG}$ indicating activation of a predetermined function is received, the input signal generator 370 can generate the input signal $S_{TP}$ to thereby enable the pre-driver circuit 372.1 to generate the drive signals $S_{UGP}$ and $S_{LGP}$. The driver circuit 374.1 may repeatedly output the ramp pulse $S_{TXP}$ according to the drive signals $S_{UGP}$ and $S_{LGP}$. The signal transformer 354 may receive the ramp pulse $S_{TXP}$ to repeatedly output the positive-going component $S_P$ from the input terminal RXP. The receiver circuit 380 may output the detection signal CK1 each time the positive-going component $S_P$ is received. Next, when it is determined that the detection signal CK1 is generated a predetermined number of consecutive times, the processing circuit 390 may generate the control signal $S_{CP}$, which can be used to enable the switch 112 shown in FIG. 1 to perform the predetermined function.

Figure 4:
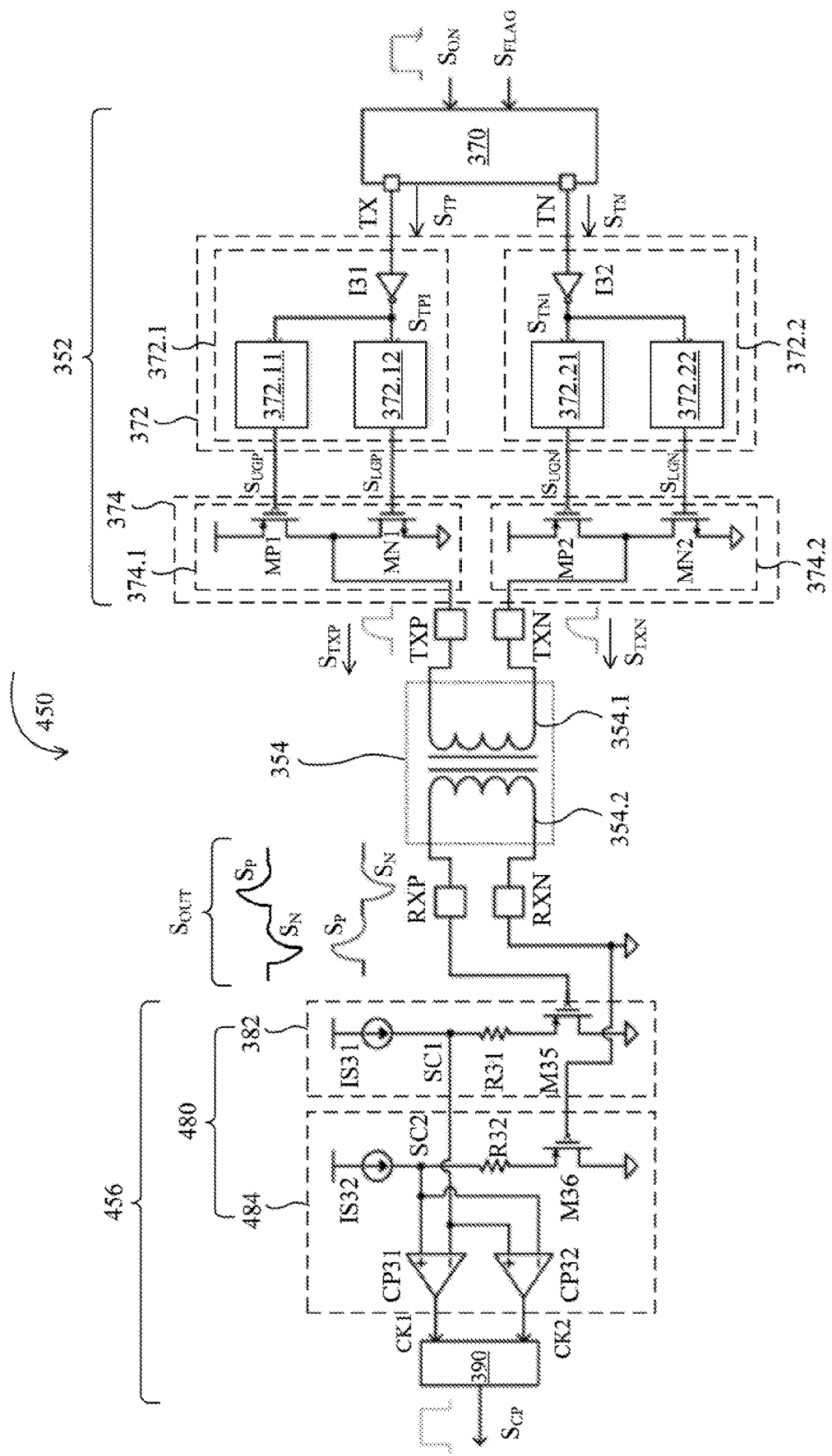
FIG. 4 illustrates another implementation of at least a portion of the signal transmission circuit shown in FIG. 1 in examples of the present disclosure.

FIG. 4 illustrates another implementation of at least a portion of the signal transmission circuit 150 shown in FIG. 1 in examples of the present disclosure. The signal transmission circuit 450 may be similar or identical to the signal transmission circuit 350 shown in FIG. 3 except for the receiver circuit 480 included in the detection circuit 456. In the present embodiment, the receiver circuit 480 may include the amplifier circuit 382 shown in FIG. 3 and a comparison circuit 484. The comparison circuit 484 may include the current source IS32, the resistor R32, the transistor M36, and the comparators CP31 and CP32 shown in FIG. 3.

As illustrated in FIG. 4, the non-inverting terminal and the inverting terminal of the comparator CP31 are coupled to the reference signal SC2 and the amplified signal SC1, respectively. The non-inverting terminal and the inverting terminal of the comparator CP32 are coupled to the amplified signal SC1 and the reference signal SC2, respectively. As a result, when the signal level of the amplified signal SC1 is greater than the signal level of the reference signal SC2, the comparator CP32 can output the detection signal CK2. When the signal level of the amplified signal SC1 is less than the signal level of the reference signal SC2, the comparator CP31 can output the detection signal CK1.

In operation, when the transmitter circuit 352 is configured to output the ramp pulses $S_{TXP}$ and $S_{TXN}$ in response to the rising portion and the falling portion of the control signal $S_{ON}$, respectively, the signal transformer 354 may output the positive-going component $S_P$ and the negative-going component $S_N$ in sequence. The receiver circuit 480 may generate the detection signals CK2 and CK1 in response to the positive-going component $S_P$ and the negative-going component $S_N$, respectively. When the transmitter circuit 352 is configured to output the ramp pulses $S_{TXN}$ and $S_{TXP}$ in response to the rising portion and the falling portion of the control signal $S_{ON}$, respectively, the signal transformer 354 may output the negative-going component $S_N$ and the positive-going component $S_P$ in sequence. The receiver circuit 480 may generate the detection signals CK1 and CK2 in response to the negative-going component $S_N$ and the positive-going component $S_P$, respectively. As those skilled in the art can appreciate the operation of the signal transmission circuit 450 after reading the above paragraphs directed to FIG. 1 to FIG. 3, further description associated with transmission of the control signals $S_{ON}$ and $S_{FLAG}$ is omitted here for brevity.

To facilitate understanding of the present disclosure, some implementations of the control circuit 130 shown in FIG. 1 are given in the following for further description of the proposed signal transmission scheme. Those skilled in the art should appreciate that other embodiments employing the structure of the control circuit 130 shown in FIG. 1 are also within the contemplated scope of the present disclosure.

Figure 5:
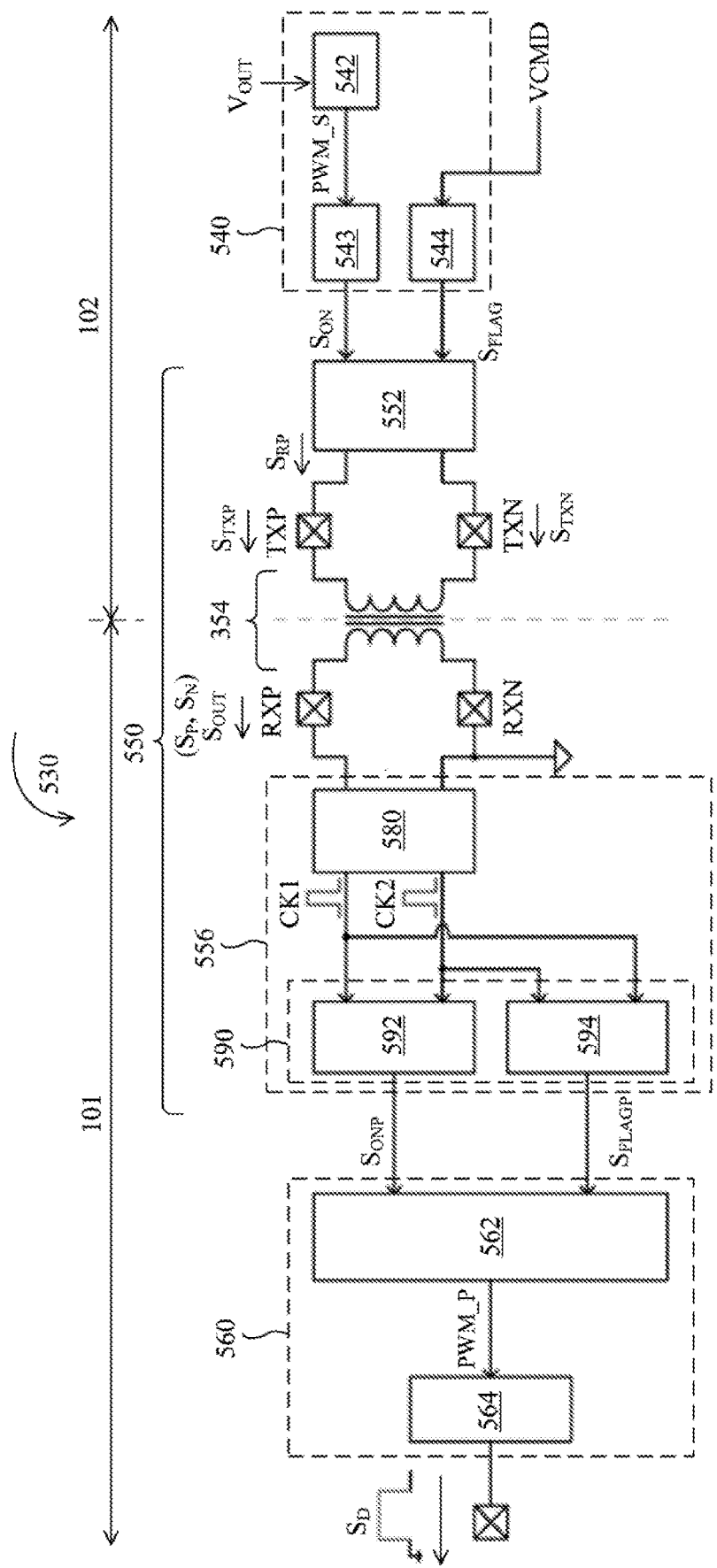
FIG. 5 illustrates an implementation of the control circuit shown in FIG. 1 in examples of the present disclosure.

FIG. 5 illustrates an implementation of the control circuit 130 shown in FIG. 1 in examples of the present disclosure. The control circuit 530 may include, but is not limited to, a control unit 540, a signal transmission circuit 550 and a control unit 560, which can be embodiments of the control unit 140, the signal transmission circuit 150 and the control unit 160 shown in FIG. 1, respectively. In addition, the control unit 540 and a portion of the signal transmission circuit 550 may be located in the secondary side 102 shown in FIG. 1. The control unit 560 and another portion of the signal transmission circuit 550 may be located in the primary side 101 shown in FIG. 1.

The control unit 540 can be configured to generate the control signal $S_{ON}$ and the control signal $S_{FLAG}$, each of which can represent an embodiment of the control signal $S_{CS}$ shown in FIG. 1. The control unit 540 may include an on-time calculator 542, a controller 543 and a controller 544. The on-time calculator 542 can be configured to generate an information signal PWM_S, such as a pulse signal or a pulse width modulation (PWM) signal, according to the output voltage $V_{OUT}$ generated from the secondary-side circuit 120 shown in FIG. 1. The information signal PWM_S can carry on-time information provided for the switch 112 shown in FIG. 1. The controller 543, coupled to the on-time calculator 542, can be configured to generate the control signal $S_{ON}$ according to the information signal PWM_S. The control signal $S_{ON}$ can indicate the on-time information carried by the information signal PWM_S. In some embodiments, the control circuit 530 may employ a constant on-time (COT) control scheme for output regulation, wherein the controller 543 may be implemented using a COT controller. The controller 543 can generate one or more pulses, each having a same pulse width, according to the information signal PWM_S, wherein the generated one or more pulses serve as the control signal $S_{ON}$ sent to the signal transmission circuit 550.

The controller 544 can be configured to generate the control signal $S_{FLAG}$, which can indicate if a predetermined function of the power converter 100 shown in FIG. 1 is activated. In the present embodiment, the controller 544 may generate the control signal $S_{FLAG}$ in response to a command signal VCMD, which can activate the controller 546 to issue a flag signal serving as the control signal $S_{FLAG}$.

The signal transmission circuit 550, coupled to the controllers 543 and 544, can be configured to transmit control information carried by the control signal $S_{ON}$ and accordingly generate a control signal $S_{ON}$p. The signal transmission circuit 550 can also be configured to transmit control information carried by the control signal $S_{FLAG}$ and accordingly generate a control signal $S_{FLAGP}$. In the present embodiment, the signal transmission circuit 550 may include the signal transformer 354 shown in FIG. 3, a transmitter circuit 552 and a detection circuit 556. The transmitter circuit 552 and the detection circuit 556 can represent embodiments of the transmitter circuit 152 and the detection circuit 156 shown in FIG. 1, respectively. By way of example but not limitation, the transmitter circuit 552 can be implemented using the transmitter circuit 352 shown in FIG. 3 or the transmitter circuit 252 shown in FIG. 2.

In the present embodiment, the transmitter circuit 552 can be configured to generate the ramp signal $S_{RP}$ according to at least one of the control signal $S_{ON}$ and the control signal $S_{FLAG}$. When the control signal $S_{FLAG}$ indicates that the predetermined function is not activated, the transmitter circuit 552 can be configured to generate the ramp signal $S_{RP}$ according to the control signal $S_{ON}$. When the control signal $S_{FLAG}$ indicates that the predetermined function is activated, the transmitter circuit 552 can be configured to generate the ramp signal $S_{RP}$ according to the control signal $S_{FLAG}$.

The detection circuit 556 can be configured to detect the positive-going component $S_P$ and the negative-going component $S_N$ of the output signal $S_{OUT}$ to generate the control signal $S_{ONP}$ and the control signal $S_{FLAGP}$. For example, when the transmitter circuit 552 is configured to generate the ramp signal $S_{RP}$ according to the control signal $S_{ON}$, the detection circuit 556 may detect that the positive-going component $S_P$ and the negative-going component $S_N$ occur one after the other, thereby generating the control signal $S_{ONP}$. When the transmitter circuit 552 is configured to generate the ramp signal $S_{RP}$ according to the control signal $S_{FLAG}$, the detection circuit 556 may detect that one of the positive-going component $S_P$ and the negative-going component $S_N$ occurs a plurality of consecutive times, thereby generating the control signal $S_{FLAGP}$.

The detection circuit 556 includes, but is not limited to, a receiver circuit 580 and a processing circuit 590. The receiver circuit 580 can be implemented using the receiver circuit 380 shown in FIG. 3 or the receiver circuit 480 shown in FIG. 4. In the present embodiment, the receiver circuit 580 can be configured to receive the positive-going component $S_P$ and the negative-going component $S_N$ to output the detection signals CK1 and CK2, respectively.

The processing circuit 590, representing an embodiment of the processing circuit 390 shown in FIG. 3, can be configured to generate the control signals $S_{ONP}$ and $S_{FLAGP}$ according to the detection signals CK1 and CK2. By way of example but not limitation, when the detection signals CK1 and CK2 are outputted one after the other, the processing circuit 590 can be configured to generate the control signal $S_{ONP}$ according to the detection signals CK1 and CK2. The control signal $S_{ONP}$ can indicate the on-time duration of the switch 112 shown in FIG. 1 defined by the detection signals CK1 and CK2. As another example, when one of the detection signals CK1 and CK2 is outputted a predetermined number of consecutive times, the processing circuit 590 can be configured to generate the control signal $S_{FLAGP}$ to enable the switch 112 shown in FIG. 1 to perform a predetermined function. In the present embodiment, when generated one after the other, the detection signals CK1 and CK2 can be used to enable a turn-on operation and a turn-off operation of the switch 112 shown in FIG. 1, respectively. When the detection signal CK2 is outputted a predetermined number of consecutive times, the processing circuit 590 can be configured to generate the control signal $S_{FLAGP}$ to enable the switch 112 shown in FIG. 1 to perform the predetermined function.

The processing circuit 590 may include an on-time signal generator 592 and a signal decoder 594. The on-time signal generator 592, coupled to the receiver circuit 580, is configured to generate the control signal $S_{ONP}$ according to the detection signals CK1 and CK2, thereby transmitting on-time information carried by the detection signals CK1 and CK2. For example, the on-time signal generator 592 can be configured to set the control signal $S_{ONP}$ to a first signal level in response to the detection signal CK1, and set the control signal $S_{ONP}$ to a second signal level in response to the detection signal CK2. As a result, the on-time duration defined by the detection signals CK1 and CK2 can be indicated by a duration of the first signal level of the control signal $S_{ONP}$.

The signal decoder 594, coupled to the receiver circuit 580, is configured to generate the control signal $S_{FLAGP}$ according to the detection signals CK1 and CK2. For example, the signal decoder 594 can be configured to count a number of times the detection signal CK2 is consecutively outputted. Before the number of times the detection signal CK2 is consecutively outputted reaches the predetermined number of consecutive times, the signal decoder 594 may reset a count of the number of times when the detection signal CK1 is outputted to the signal decoder 594. When the number of times the detection signal CK2 is consecutively outputted reaches the predetermined number of consecutive times, the signal decoder 594 is configured to generate the control signal $S_{FLAGP}$.

The control unit 560, coupled between the detection circuit 556 and the switch 112 shown in FIG. 1, can be configured to generate the drive signal $S_D$ according to at least one of the control signal $S_{ONP}$ and the control signal $S_{FLAGP}$. The control unit 560 may include a controller 562 and a driver 564. The controller 562 can be configured to generate an information signal PWM_P, such as a pulse signal or a PWM signal. The information signal PWM_P can carry control information provided for the switch 112 shown in FIG. 1. For example, when the control signal $S_{FLAGP}$ indicates that the predetermined function is not activated, the controller 562 can be configured to generate the information signal PWM_P according to the control signal $S_{ONP}$. When the control signal $S_{FLAGP}$ indicates that the predetermined function is activated, the controller 562 can be configured to generate the information signal PWM_P according to the control signal $S_{FLAGP}$. In addition, the driver 564, coupled to the switch 112 shown in FIG. 1, can be configured to generate the drive signal $S_D$ according to the information signal PWM_P.

Figure 6:
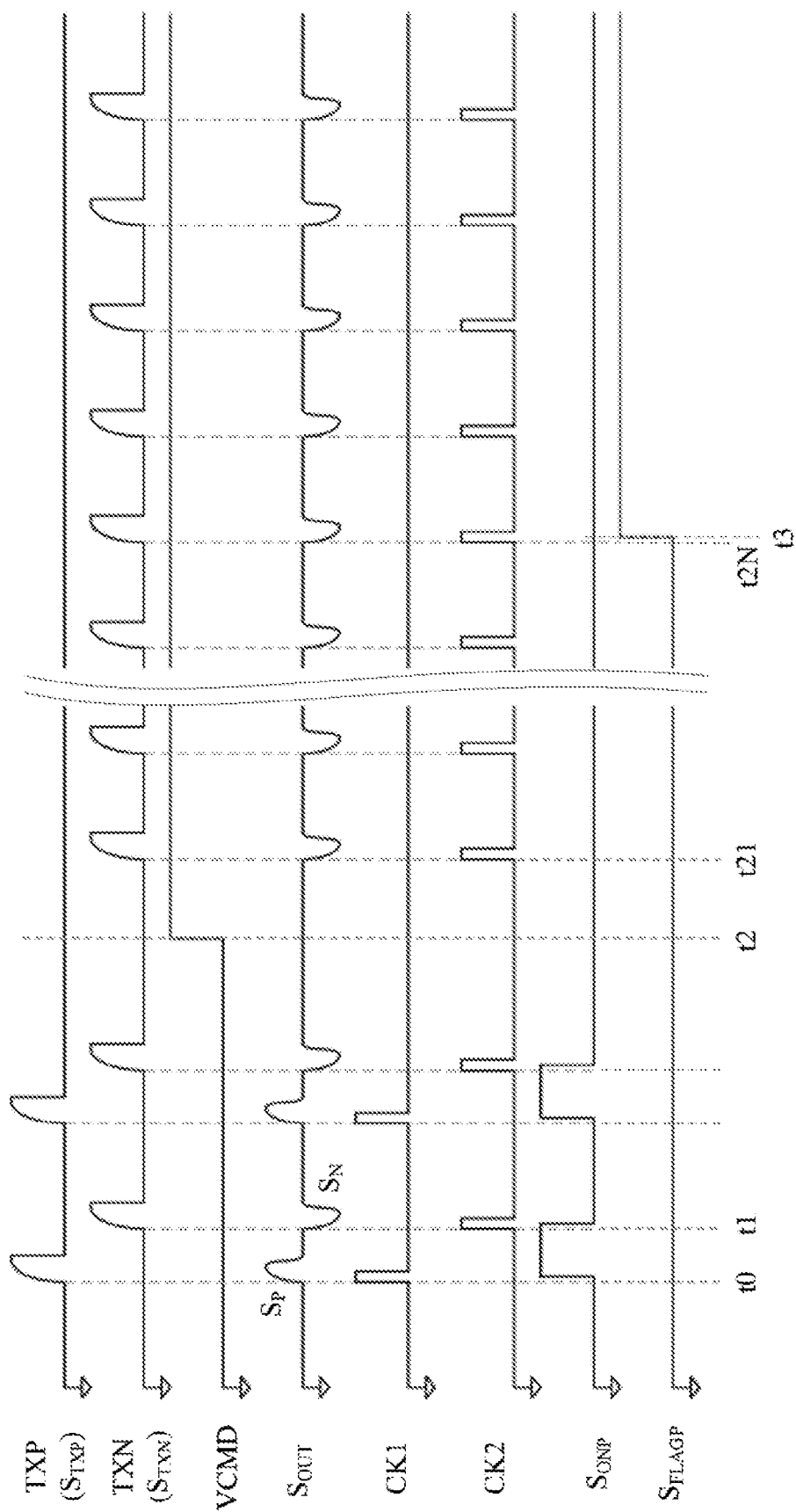
FIG. 6 illustrates signal waveforms associated with operation of the control circuit shown in FIG. 5 in examples of the present disclosure.

FIG. 6 illustrates signal waveforms associated with operation of the control circuit 530 shown in FIG. 5 in examples of the present disclosure. Referring to FIG. 6 and also to FIG. 5, in the present embodiment, the control circuit 530 may firstly provide control information indicating an on-time duration of the switch 112 shown in FIG. 1, and then provide control information indicating activation of a predetermined function of the power converter 100 shown in FIG. 1. When the control circuit 530 is configured to provide the control information indicating the on-time duration, the detection signals CK1 and CK2 are generated in response to the positive-going component $S_P$ and the negative-going component $S_N$ of the output signal $S_{OUT}$, respectively.

At time t0, the transmitter 552 can output the ramp pulse $S_{TXP}$ in response to a rising portion of the control signal $S_{ON}$. The signal transformer 354 can convert the ramp pulse $S_{TXP}$ to generate the positive-going component $S_P$ of the output signal $S_{OUT}$. The receiver circuit 580 can detect the positive-going component $S_P$ to output the detection signal CK1, which is a pulse signal in the present embodiment. Next, the on-time signal generator 592 can set the control signal $S_{ONP}$ to a first signal level such as a logic high level. The control signal $S_{ONP}$ at the first signal level can be used to enable a turn-on operation of the switch 112 shown in FIG. 1.

At time t1, the transmitter 552 can output the ramp pulse $S_{TXN}$ in response to a falling portion of the control signal $S_{ON}$. The signal transformer 354 can convert the ramp pulse $S_{TXN}$ to generate negative-going component $S_N$ of the output signal $S_{OUT}$. The receiver circuit 580 can detect the negative-going component $S_N$ to output the detection signal CK2, which is a pulse signal in the present embodiment. Next, the on-time signal generator 592 can set the control signal $S_{ONP}$ to a second signal level such as a logic low level. The control signal $S_{ONP}$ at the second signal level can be used to enable a turn-off operation of the switch 112 shown in FIG. 1. As a result, the duration of the first signal level of the control signal $S_{ONP}$ can correspond to the on-time duration of the switch 112 shown in FIG. 1. The control signal $S_{ONP}$ can indicate on-time information provided for the switch 112 shown in FIG. 1.

At time t2, the command signal VCMD goes high to indicate activation of a predetermined function of the power converter 100 shown in FIG. 1. The controller 544 is activated by the command signal VCMD to output the control signal $S_{FLAG}$, thereby informing the transmitter circuit 552 about activation of the predetermined function. After time t2, the transmitter 552 can repeatedly output the ramp pulse $S_{TXN}$ a plurality of consecutive times. Accordingly, the signal transformer 354 can repeatedly output the negative-going component $S_N$, and the receiver circuit 580 can repeatedly output the detection signal CK2. In some embodiments, the transmitter 552 can modulate a frequency of the repeatedly outputted negative-going component $S_N$. For example, the transmitter 552 can repeatedly output negative-going component $S_N$ at a predetermined frequency. At time t3, as the number of times that the detection signal CK2 is consecutively outputted reaches a predetermined number of consecutive times, the signal decoder 594 can set the control signal $S_{FLAGP}$ to a logic high level. The control signal $S_{FLAGP}$ at the logic high level can inform the controller 562 about activation of the predetermined function.

Figure 7:
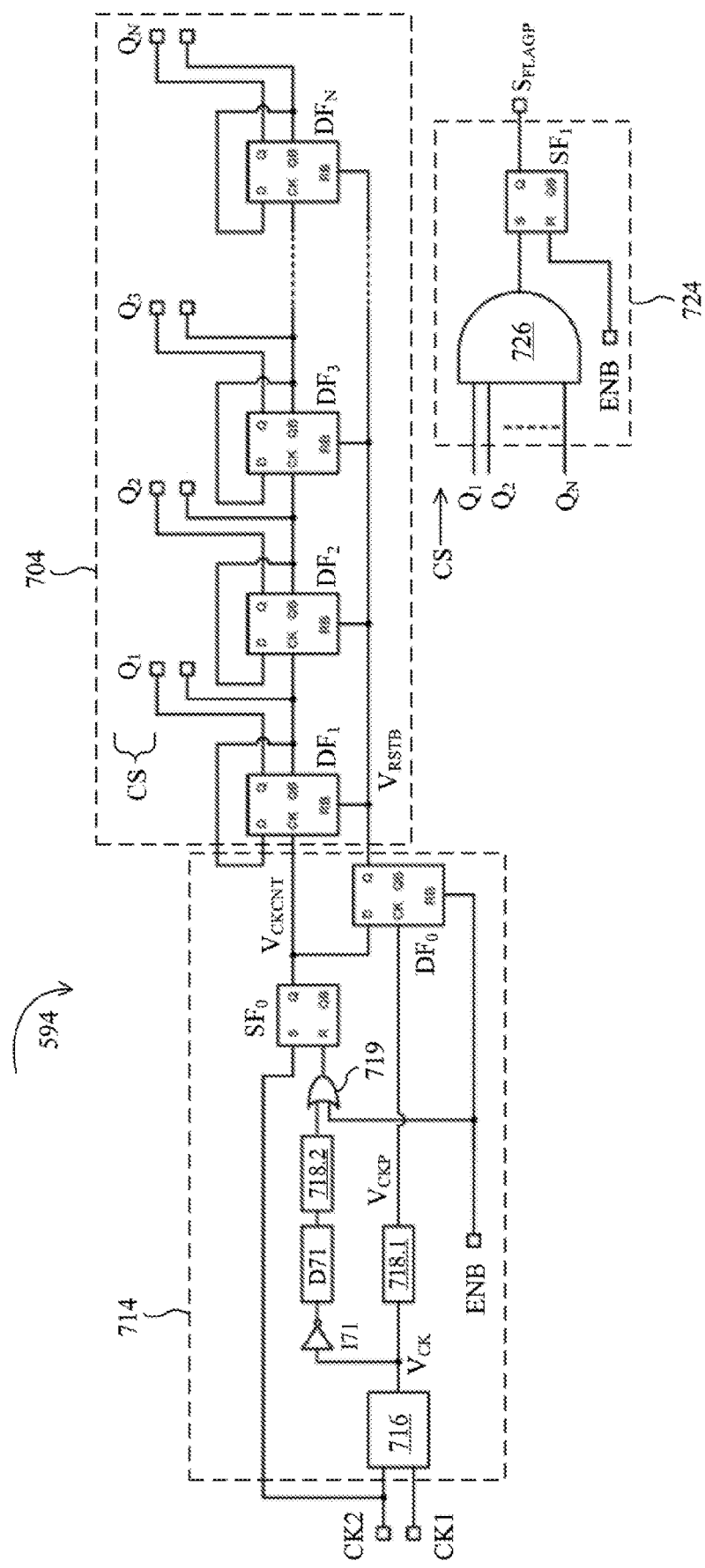
FIG. 7 illustrates an implementation of the signal decoder shown in FIG. 5 in examples of the present disclosure.

FIG. 7 illustrates an implementation of the signal decoder 594 shown in FIG. 5 in examples of the present disclosure. In the present embodiment, the signal decoder 594 includes, but is not limited to, a counter circuit 704, a trigger circuit 714 and an output circuit 724. The counter circuit 704 can be configured to count a number of times the detection signal CK2 is consecutively outputted, and accordingly generate a count signal CS indicating the number of times the detection signal CK2 is consecutively outputted. The counter circuit 704 may include a plurality of D flip-flops $DF_1$-$DF_N$ coupled in cascade, wherein N is a positive integer greater than one. Each D flip-flop includes a clock input terminal CK, a data input terminal D, a data output terminal Q, an inverted data output terminal QB and a reset terminal RB. The D flip-flops $DF_1$-$DF_N$ are configured to count a number of clock cycles of a clock signal $V_{CKCNT}$ to generate the count signal CS, which includes respective data outputs $Q_1$-$Q_N$ of the D flip-flops $DF_1$-$DF_N$. The clock signal $V_{CKCNT}$ is generated in response to the detection signal CK2.

The trigger circuit 714, coupled between the receiver circuit 580 shown in FIG. 5 and the counter circuit 704, can be configured to enable the counter circuit 704 according to the detection signal CK2, and reset the counter circuit 704 according to the detection signal CK1. For example, the trigger circuit 714 can output the clock signal $V_{CKCNT}$ when the detection signal CK2 is received a plurality of consecutive times, and reset the counter circuit 704 when the detection signal CK1 is received immediately after the detection signal CK2. In the present embodiment, the trigger circuit 714 may include a clock generator 716, a plurality of one-shot circuits 718.1 and 718.2, an inverter 171, a delay element D71, an OR gate 719, an SR flip-flop $SF_0$ and a D flip-flop $DF_0$. The clock generator 716 is configured to generate a clock signal $V_{CK}$ according to the detection signals CK1 and CK2.

By way of example but not limitation, the clock generator 716 may generate a pulse of the clock signal $V_{CK}$ each time the detection signal CK1 is inputted to the clock generator 716 immediately after the detection signal CK2 is inputted. The one-shot circuit 718.1 is configured to generate a clock signal $V_{CKP}$ according to the clock signal $V_{CK}$. In the present embodiment, the one-shot circuit 718.1 may generate the clock signal $V_{CKP}$ in response to each pulse of the clock signal $V_{CK}$, wherein each pulse of the clock signal $V_{CKP}$ may have a longer duration than a corresponding pulse of the clock signal $V_{CK}$. In addition, the inverter 171, the delay element D71 and the one-shot circuit 718.2 are coupled in cascade between the clock generator 716 and an input of the OR gate 719. Another input of the OR gate 719 is coupled to an enable signal ENB. The SR flip-flop $SF_0$ includes a set terminal S, a reset terminal R, a data output terminal Q and an inverted data output terminal QB. The set terminal S is coupled to the detection signal CK2. The reset terminal R is coupled to an output of the OR gate 719. The data output terminal Q of the SR flip-flop $SF_0$ can be configured to generate the clock signal $V_{CKCNT}$.

The D flip-flop $DF_0$ includes a clock input terminal CK, a data input terminal D, a data output terminal Q, an inverted data output terminal QB and a reset terminal RB. The clock input terminal CK of the D flip-flop $DF_0$ is coupled to the clock signal $V_{CKP}$. The data input terminal D of the D flip-flop $DF_0$ is coupled to the data output terminal of the SR flip-flop $SF_0$. The data output terminal Q of the D flip-flop $DF_0$ is arranged to output a reset signal $V_{RSTB}$. The reset terminal RB of the D flip-flop $DF_0$ is coupled to the enable signal ENB. After reading the above paragraphs directed to FIG. 3 to FIG. 6, those skilled in the art should appreciate that the trigger circuit 714 can enable the counter circuit 704 to count the number of times the detection signal CK2 is consecutively outputted. Further description of the trigger circuit 714 is therefore omitted here for brevity.

The output circuit 724, coupled to the counter circuit 704, can be configured to generate the control signal $S_{FLAGP}$. For example, the output circuit 724 is configured to receive the count signal CS to determine if the number of times the detection signal CK2 is consecutively outputted reaches a predetermined number of consecutive times. When the number of times the detection signal CK2 is consecutively outputted reaches the predetermined number of consecutive times, the output circuit 724 is configured to generate the control signal $S_{FLAGP}$.

In the present embodiment, the output circuit 724 may include an AND gate 726 and an SR flip-flop $SF_1$. The AND gate 726 is configured to receive the data outputs $Q_1$-$Q_N$ of the D flip-flops $DF_1$-$DF_N$. The SR flip-flop $SF_1$ includes a set terminal S, a reset terminal R, a data output terminal Q and an inverted data output terminal QB. The set terminal S of the SR flip-flop $SF_1$ is coupled to an output of the AND gate 726. The reset terminal R of the SR flip-flop $SF_1$ is coupled to the enable signal ENB. The data output terminal Q of the SR flip-flop $SF_1$ can be configured to output the control signal $S_{FLAGP}$. In the present embodiment, when each of the data outputs $Q_1$-$Q_N$ has a logic high level, i.e. the number of times the detection signal CK2 is consecutively outputted reaches the predetermined number of consecutive times, the output circuit 724 may output the control signal $S_{FLAGP}$ having a logic high level.

Referring back to FIG. 5 and also to FIG. 7, in operation, the trigger circuit 714 may generate the clock signal $V_{CKCNT}$ according to the detection signal CK2 after time t2, thereby enabling the counter circuit 704 to count a number of times the detection signal CK2 is consecutively received. For example, before the number of times the detection signal CK2 is consecutively received reaches a predetermined number of consecutive times, a count value indicated by the count signal CS may be incremented each time the detection signal CK2 is received, e.g. at time t21. At time t2N, the number of times the detection signal CK2 is consecutively received may reach the predetermined number of consecutive times. Next, the output circuit 724 may set the control signal $S_{FLAGP}$ to a high logic level, e.g. at time t3.

It is worth noting that the circuit structure shown in FIG. 7 is provided for illustrative purposes, and is not intended to limit the scope of the present disclosure. The circuit structure of the signal decoder 594 can be modified as long as the signal decoder 594 can identify the number of times that the detection signal CK2 is consecutively received to thereby generate the control signal $S_{FLAGP}$ indicating activation of a predetermined function.

Figure 8:
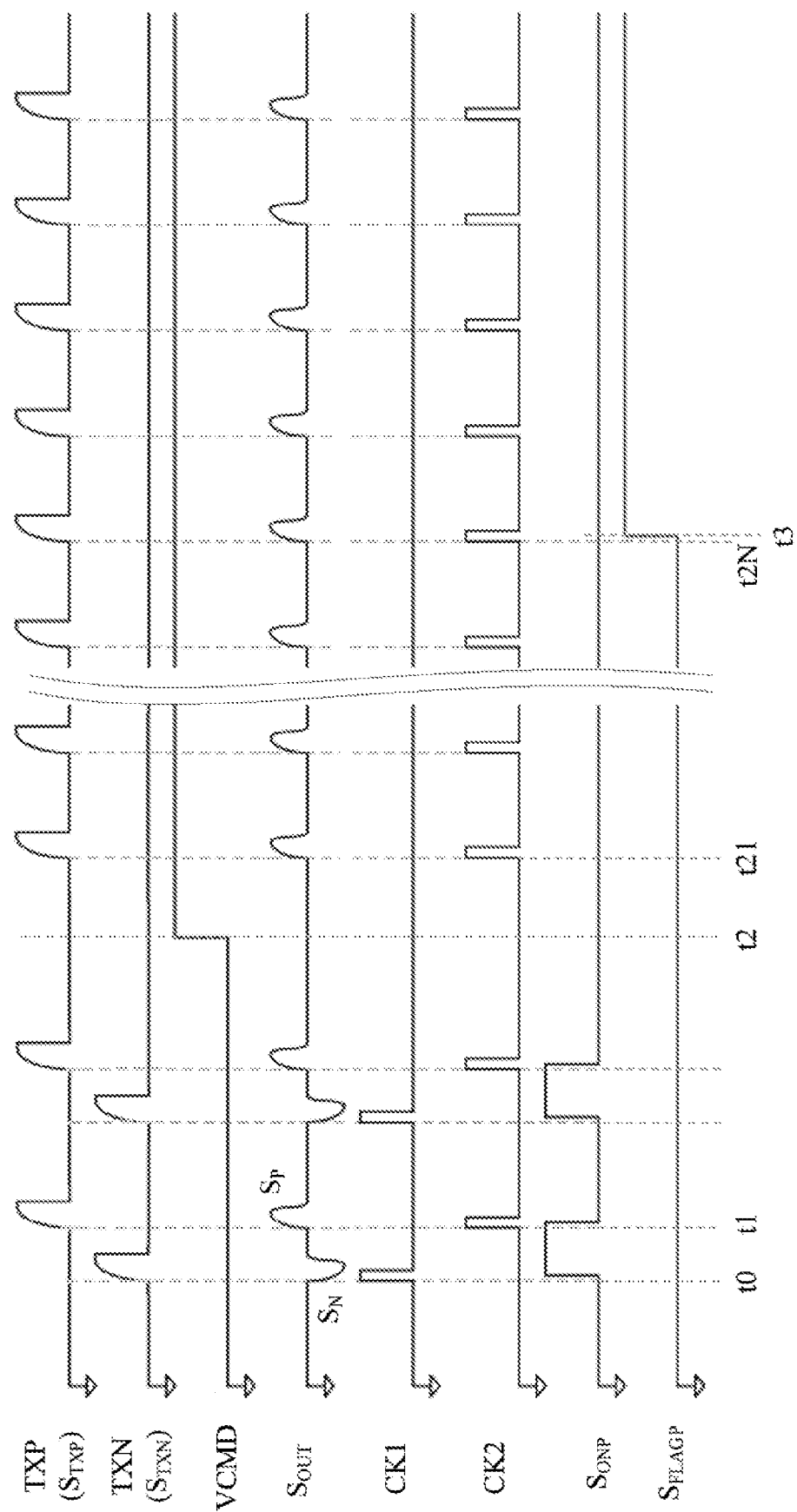
FIG. 8 illustrates signal waveforms associated with operation of the control circuit shown in FIG. 5 in examples of the present disclosure.

FIG. 8 illustrates signal waveforms associated with operation of the control circuit 530 shown in FIG. 5 in examples of the present disclosure. The signal waveforms shown in FIG. 7 may be similar to those shown in FIG. 6 except that the detection signals CK1 and CK2 are generated in response to the negative-going component $S_N$ and the positive-going component $S_P$ of the output signal $S_{OUT}$, respectively. Referring to FIG. 7 and also to FIG. 5, in the present embodiment, the transmitter 552 can output the ramp pulses $S_{TXN}$ and $S_{TXP}$ in response to a rising portion and a falling portion of the control signal $S_{ON}$. The signal transformer 354 can generate the negative-going component $S_N$ and the positive-going component $S_P$ of the output signal $S_{OUT}$ in response to the ramp pulses $S_{TXN}$ and $S_{TXP}$, respectively. Also, when the controller 544 is activated by the command signal VCMD having a logic high level to issue the control signal $S_{FLAG}$, the transmitter 552 can be configured to output the ramp pulse $S_{TXP}$ a plurality of consecutive times. As those skilled in the art can appreciate the operation of the control circuit 530 shown in FIG. 5 described with reference to the signal waveforms shown in FIG. 8 after reading the above paragraphs directed to FIG. 1 to FIG. 7, further description is omitted here for brevity.

Figure 9:
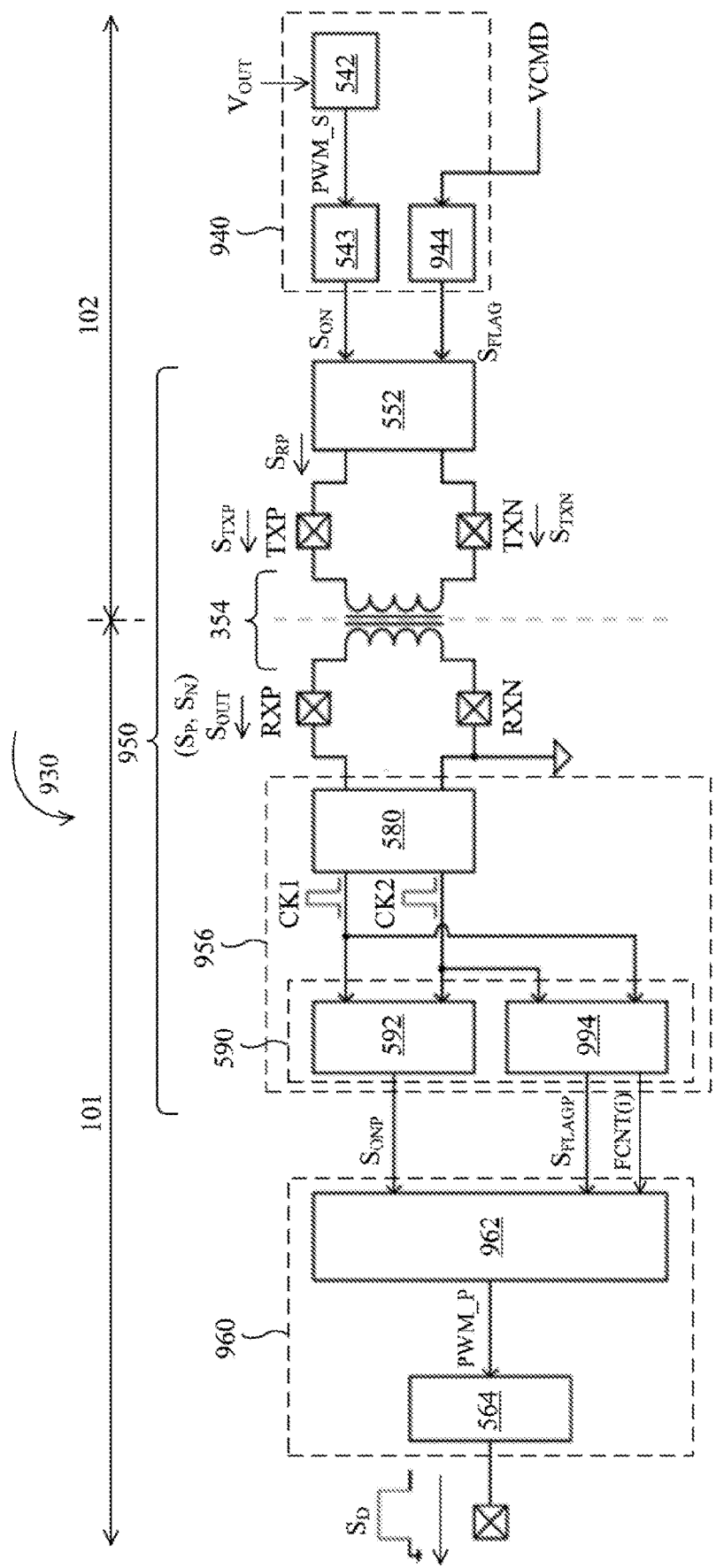
FIG. 9 illustrates an implementation of the control circuit shown in FIG. 1 in examples of the present disclosure.

In some embodiments, the proposed signal transmission scheme may transmit control information indicating a function type of a predetermined function of a power converter. FIG. 9 illustrates an implementation of the control circuit 130 shown in FIG. 1 in accordance with some embodiments of the present disclosure. The circuit topology of the control circuit 930 can be similar or identical to that of the control circuit 530 shown in FIG. 5 except that the signal transmission circuit 950 can receive the control signal $S_{FLAG}$ which can carry information indicating a function type of a predetermined function of the power converter 100 shown in FIG. 1. Additionally, or alternatively, the signal transmission circuit 950 can output a control signal FCNT(i) which can carry information indicating a function type of a predetermined function of the power converter 100 shown in FIG. 1.

In the present embodiment, when the control unit 940 is configured to generate the control signal $S_{FLAG}$ indicating that a predetermined function is activated, a number of times that the ramp pulse $S_{TXN}$ is consecutively outputted from the transmitter circuit 552 can be determined according to a function type of the predetermined function. For example, the controller 944 can be configured to generate the control signal $S_{FLAG}$ according to the command signal VCMD. The command signal VCMD can not only activate the controller 944 to output the control signal $S_{FLAG}$ but also indicate a function type of the predetermined function. In some embodiments, the command signal VCMD may activate the controller 944 to output the control signal $S_{FLAG}$ having a predetermined number of cycles, wherein the predetermined number of cycles is determined according to the function type of the predetermined function. The transmitter circuit 552 can receive the control signal $S_{FLAG}$ to consecutively output the ramp pulse $S_{TXN}$ a predetermined number of times. The predetermined number of times that the ramp pulse $S_{TXN}$ is consecutively outputted may be equal to the predetermined number of cycles of the control signal $S_{FLAG}$.

Additionally, or alternatively, when the control signal $S_{FLAG}$ indicates that a predetermined function is activated, the detection circuit 956 can be configured to generate the control signal FCNT(i) by detecting a number of times that the negative-going component $S_N$ consecutively occurs. The control unit 960 can be configured to determine a function type of the predetermined function according to the control signal FCNT(i). For example, when the control signal $S_{FLAG}$ indicates that a predetermined function is activated, the receiver circuit 580 can be configured to consecutively output the detection signal CK2 a plurality of times according to the negative-going component $S_N$ which is repeatedly outputted from the signal transformer 354. The signal decoder 994 can be configured to identify a number of times that the detection signal CK2 is consecutively outputted from the receiver circuit 580. When the number of times the detection signal CK2 is consecutively outputted reaches a predetermined number of consecutive times, the signal decoder 994 can be configured to output the control signal FCNT(i) which can indicate the predetermined number of consecutive times. The controller 962 can be configured to determine the function type of the predetermined function according to the control signal FCNT(i).

Figure 10:
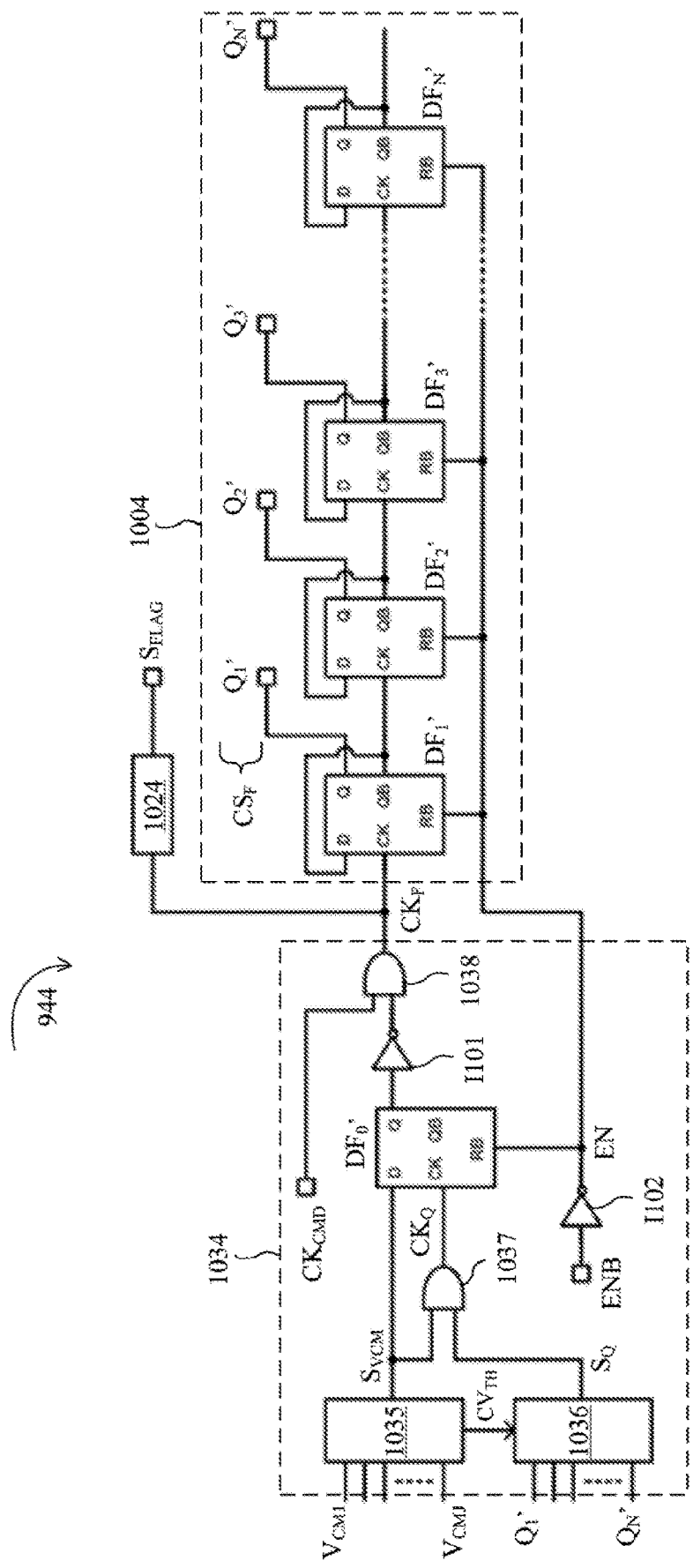
FIG. 10 illustrates an implementation of the controller shown in FIG. 9 in examples of the present disclosure.

FIG. 10 illustrates an implementation of the controller 944 shown in FIG. 9 in examples of the present disclosure. Referring to FIG. 10 and also to FIG. 9, the controller 944 may include, but is not limited to, a counter circuit 1004, an output circuit 1024 and a trigger circuit 1034. The counter circuit 1004 can be configured to count a number of cycles of the control signal $S_{FLAG}$ and accordingly generate a count signal $CS_F$. In the present embodiment, the output circuit 1024 configured to generate the control signal $S_{FLAG}$ can be implemented using a one-shot circuit. As a result, the number of cycles of the control signal $S_{FLAG}$ can be equal to a number of clock cycles of a clock signal $CK_F$ which is inputted to the one-shot circuit. The counter circuit 1004 can count the number of clock cycles of the clock signal $CK_F$ to thereby count the number of cycles of the control signal $S_{FLAG}$. By way of example, the counter circuit 1004 may include a plurality of D flip-flops $DF_1$-$DF_{N'}$ coupled in cascade, wherein N is a positive integer greater than one. Each D flip-flop includes a clock input terminal CK, a data input terminal D, a data output terminal Q, an inverted data output terminal QB and a reset terminal RB. The D flip-flops $DF_1$-$DF_{N'}$ are configured to count the number of clock cycles of the clock signal $CK_F$ to generate the count signal $CS_F$, which includes respective data outputs $Q_1$-$Q_{N'}$ of the D flip-flops $DF_1$-$DF_{N'}$.

The trigger circuit 1034 can be configured to generate the clock signal $CK_F$ in response to one of J command signals $V_{CM1}$-$V_{CMJ}$, wherein J is a positive integer. Each of the command signals $V_{CM1}$-$V_{CMJ}$ can serve as the command signal VCMD. Additionally, the command signals $V_{CM1}$-$V_{CMJ}$ can cause the clock signal $CK_F$ to have different number of clock cycles, thereby producing the control signal $S_{FLAG}$ having different number of cycles. As the signal transmission circuit 950 can generate the control signal FCNT(i) in response to the number of cycles of the control signal $S_{FLAG}$, the command signals $V_{CM1}$-$V_{CMJ}$ can cause the control unit 960 to enable the switch 112 shown in FIG. 1 to perform different types of functions, such as under voltage lockout protection, short circuit protection, over voltage protection, over current protection and other types of protection functions.

By way of example but not limitation, the trigger circuit 1034 may include signal generators 1035 and 1036, AND gates 1037 and 1038, inverters I101 and I102, and a D flip flop $DF_0$. The signal generator 1035 is configured to receive one of the command signals $V_{CM1}$-$V_{CMJ}$ to generate a predetermined value $CV_{TH}$ and a data signal $S_{VCM}$. The signal generator 1036 is configured to generate a clock signal $S_Q$ according to the predetermined value $CV_{TH}$ and the count signal $CS_F$. For example, before a count value indicated by the count signal $CS_F$ reaches the predetermined value $CV_{TH}$, the signal generator 1036 may consecutively output a pulse serving as a portion of the clock signal $S_Q$. When the count value indicated by the count signal $CS_F$ reaches the predetermined value $CV_{TH}$, the signal generator 1036 may stop outputting a pulse such that the clock signal $S_Q$ may stay at a logic low level.

In addition, the AND gate 1037 can generate a clock signal $CK_Q$ according to the data signal $S_{VCM}$ and the clock signal $S_Q$, and send the clock signal $CK_Q$ to a clock input terminal CK of the D flip-flop $DF_{0'}$. The inverter I101 is configured to invert a data output at a data output terminal Q of the D flip-flip $DF_{0'}$. The inverter I102 is configured to invert the enable signal ENB to generate an inverted signal EN, which is coupled to the respective reset terminals RB of the D flip-flips $DF_{0'}$ and $DF_1$-$DF_N$. The AND gate 1038 is configured to generate the clock signal $CK_F$ according to a clock signal $CK_{CMD}$ and an output of the inverter I101. As a result, before the count value indicated by the count signal $CS_F$ reaches the predetermined value $CV_{TH}$, the AND gate 1038 may consecutively output a pulse serving as a portion of the clock signal $CK_F$. After the count value indicated by the count signal $CS_F$ reaches the predetermined value $CV_{TH}$, the clock signal $CK_F$ may stay at a logic low level.

Figure 11:
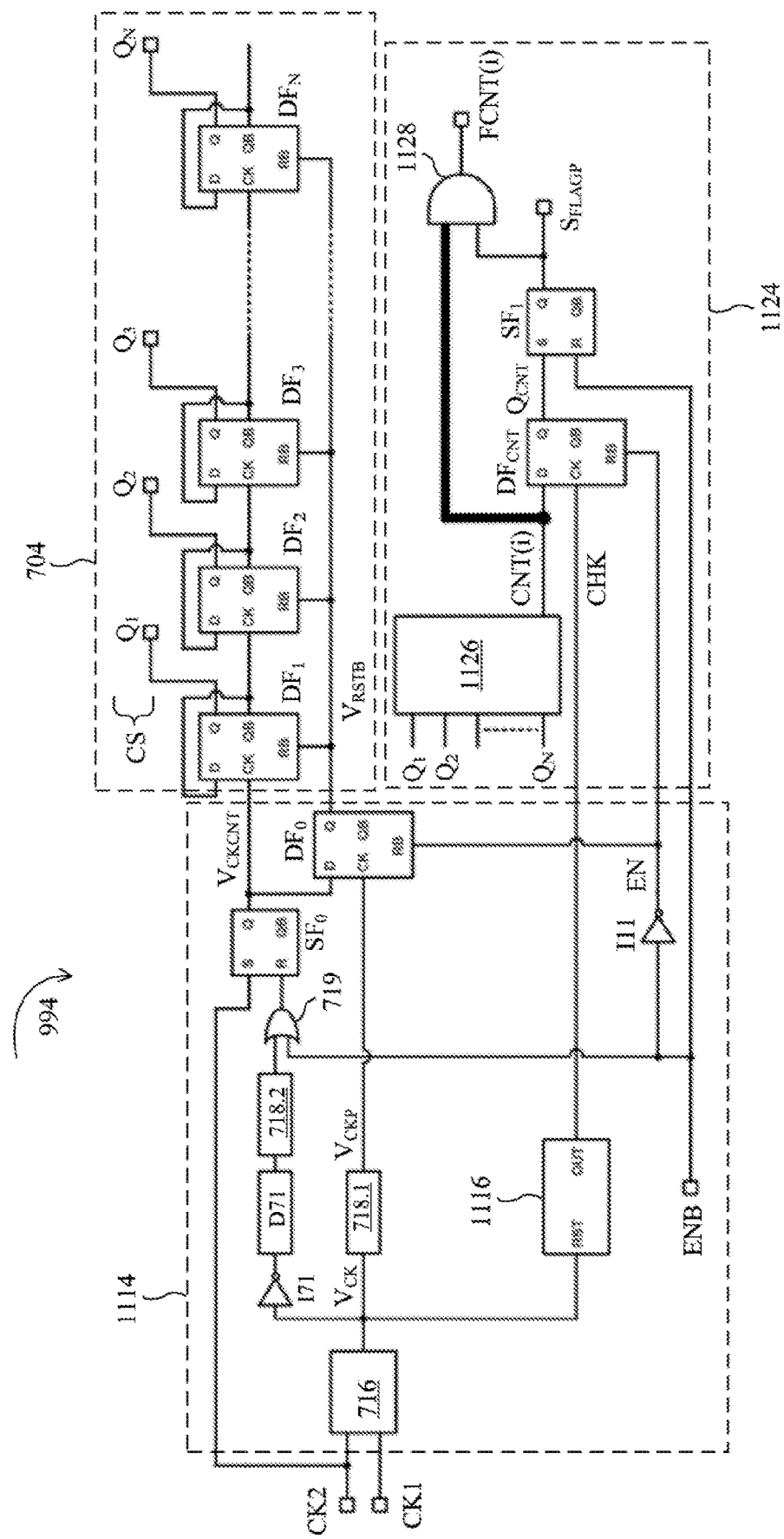
FIG. 11 illustrates an implementation of the signal decoder shown in FIG. 9 in examples of the present disclosure.

FIG. 11 illustrates an implementation of the signal decoder 994 shown in FIG. 9 in examples of the present disclosure. The circuit topology of the signal decoder 994 can be similar or identical to that of the signal decoder 794 shown in FIG. 7 except for the trigger circuit 1114 and the output circuit 1124. In the present embodiment, the trigger circuit 1114 can be similar or identical to that of the trigger circuit 714 shown in FIG. 7 except for the counter 1116 and the inverter I11. The counter 1116 is configured to count the number of times that the detection signal CK2 is consecutively outputted, and issue a pulse signal CHK from an output terminal OUT when the number of times that the detection signal CK2 is consecutively outputted reaches a predetermined number of consecutive times. In addition, the counter 1116 can receive the clock signal $V_{CK}$ from a reset terminal RST to reset a count thereof. The inverter I11 is configured to invert the enable signal ENB to generate an inverted signal EN, which is coupled to the reset terminal RB of the D flip-flop $DF_0$.

The output circuit 1124 may include the SR flip-flop $SF_1$ shown in FIG. 7, a controller 1126, a D flip-flop $DF_{CNT}$ and an AND gate 1128. The controller 1126 can be configured to convert the count signal CS of N bits, i.e. the data outputs $Q_1$-$Q_N$, to a data signal CNT(i), where i ranges from 1 to $2^N$. The data signal CNT(i) corresponds to a count value indicated by the count signal CS. By way of example but not limitation, the controller 1126 can output a data signal CNT(1) at a logic high level when the count signal CS indicates a decimal count value of 1, the controller 1126 can output a data signal CNT(2) at a logic high level when the count signal CS indicates a decimal count value of 2, and so on. The D flip-flop $DF_{CNT}$, clocked by the pulse signal CHK, is configured to receive the data signal CNT(i) and accordingly send a data output $Q_{CNT}$ to the SR flip-flop $SF_1$. In addition, the AND gate 1128 is configured to receive the data signal CNT(i) and the control signal $S_{FLAGP}$ to generate the control signal FCNT(i).

Figure 12:
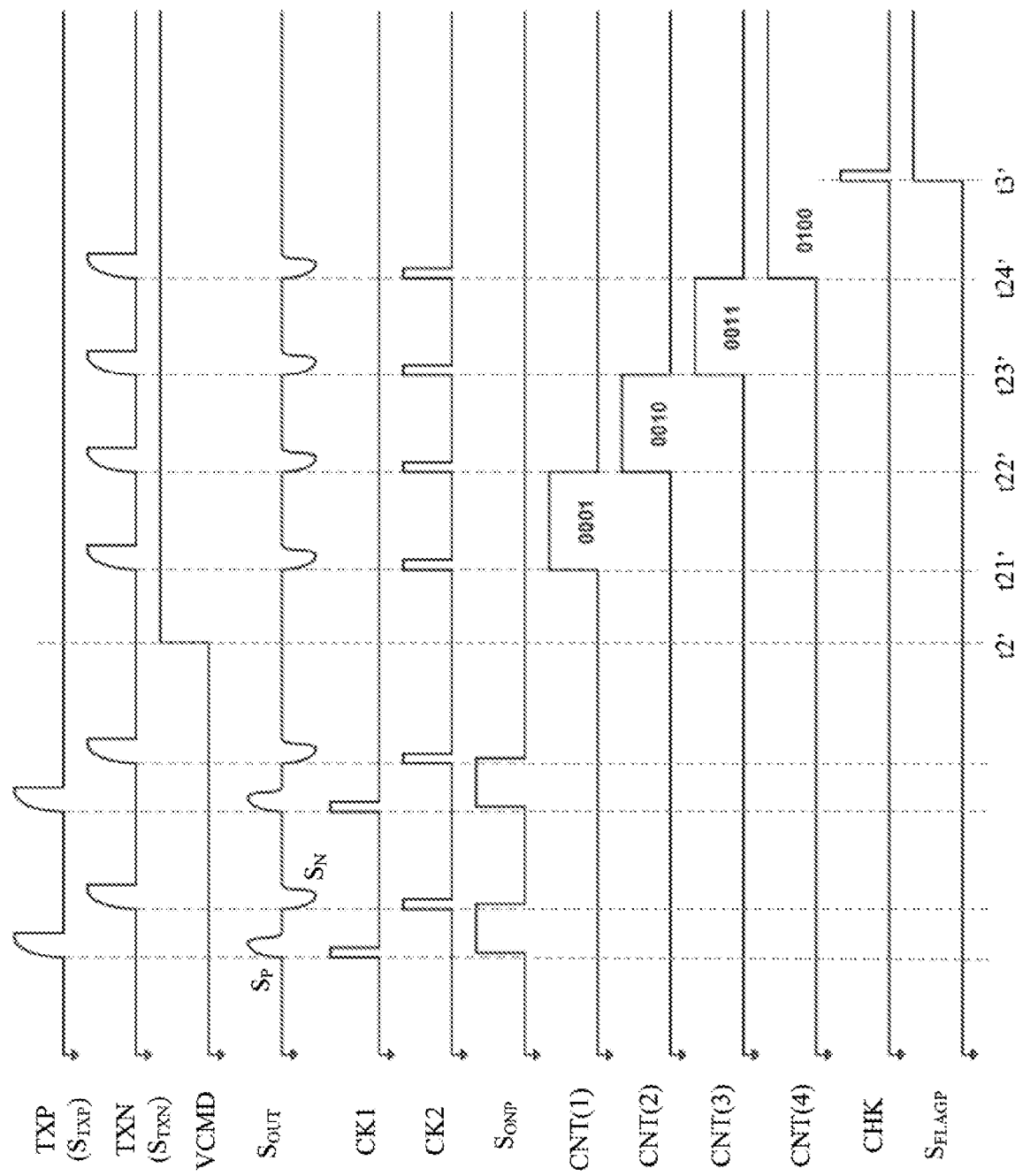
FIG. 12 illustrates signal waveforms associated with operation of the control circuit shown in FIG. 9 in examples of the present disclosure.

FIG. 12 illustrates signal waveforms associated with operation of the control circuit 930 shown in FIG. 9 in examples of the present disclosure. Referring to FIG. 12 and also to FIGS. 9-11, prior to time t2', the signal transmission circuit 950 can transmit the control signal $S_{ON}$ sent from the control unit 940 to generate the control signal $S_{ONP}$. At time t2', the command signal VCMD goes high to indicate activation of a predetermined function of the power converter 100 shown in FIG. 1. By way of example but not limitation, the command signal VCMD can be one of the command signals $V_{CM1}$-$V_{CMJ}$, which can cause the output circuit 1024 to output the control signal $S_{FLAG}$ having four cycles. Accordingly, the transmitter circuit 552 can output the ramp pulse $S_{TXN}$ four consecutive times from time t21' to time t24'.

At time t21', the receiver circuit 580 can receive the negative-going component $S_N$ to generate the detection signal CK2. The count signal CS can be represented by a binary number 0001, which indicates a decimal count value of 1. As a result, the controller 1126 can output the data signal CNT(1) having a logic high level. Similarly, the controller 1126 can output the data signal CNT(2) having a logic high level at time t22', output the data signal CNT(3) having a logic high level at time t23', and output the data signal CNT(4) having a logic high level at time t24'. After time t24', the signal generator 1036 can determine that the count value indicated by the count signal $CS_F$ reaches the predetermined value $CV_{TH}$. As a result, the trigger circuit 1034 may output the clock signal $CK_F$ having a logic low level. The count value indicated by the count signal $CS_F$ may be kept unchanged.

At time t3', as the detection signal CK2 has been received four consecutive times, the counter 1116 can issue the pulse signal CHK to clock the D flip-flop $DF_{CNT}$. The D flip-flop $DF_{CNT}$ can output the data output $Q_{CNT}$ having a logic high level in response to the count signal CNT(4). The SR flip-flop $SF_1$ can output the control signal $S_{FLAGP}$ having a logic high level in response to the data output $Q_{CNT}$. Also, the AND gate 1128 can generate the control signal FCNT(i) having a logic high level. The controller 962 generate the information signal PWM_P according to the control signal $S_{FLAGP}$ and the control signal FCNT(i). The control signal $S_{FLAGP}$ can inform the controller 962 about activation of the predetermined function. The control signal FCNT(i) can inform the controller 962 about the function type of the predetermined function.

It is worth noting that the circuit structures shown in FIG. 10 and FIG. 11 are provided for illustrative purposes, and are not intended to limit the scope of the present disclosure. In some embodiment, the controller 944 shown in FIG. 10 can be implemented using other circuit structures as long as the number of cycles of the control signal $S_{FLAG}$ can vary in response to the different command signals $V_{CM1}$-$V_{CMJ}$. In some embodiments, the signal decoder 994 shown in FIG. 11 can be implemented using other circuit structures as long as the control signal FCNT(i) can be generated in response to the number of times that the detection signal CK2 is consecutively received.

With the aid of the proposed control scheme, a power converter utilizing secondary-side regulation can not only employ a signal transformer having a small mutual inductance, but also identify control information carried by a message sent from a secondary-side circuit. For example, the proposed control scheme can identify a variety of control information according to at least one of a positive-going component and a negative-going component induced using the signal transformer. As a result, the proposed control scheme or signal transmission scheme can ensure the safety and stability of the power converter.

Those of ordinary skill in the art may recognize that modifications of the embodiments disclosed herein are possible. For example, a frequency of the repeatedly generated signal component may vary. Other modifications may occur to those of ordinary skill in this art, and all such modifications are deemed to fall within the purview of the present invention, as defined by the claims.

The invention claimed is:

1. A signal transmission circuit for transmitting control information from a secondary side of a power converter to a primary side of the power converter, the signal transmission circuit comprising:
   a transmitter circuit, configured to generate a ramp signal at least according to a first control signal outputted from the secondary side, wherein the first control signal indicates the control information provided for a switch in the primary side;
   a signal transformer, coupled to the transmitter circuit, the signal transformer being configured to convert the ramp signal to generate an output signal, wherein the output signal comprises at least one positive-going component and at least one negative-going component to indicate the control information; and
   a detection circuit, coupled to the signal transformer, the detection circuit being configured to detect the at least one of the positive-going component and the at least one negative-going component and to generate a second control signal to provide the control information for the switch.

2. The signal transmission circuit of claim 1, wherein when the first control signal is an on signal, the at least one positive-going component and the at least one negative-going component are generated one after the other, the detection circuit is configured to generate a first portion of the second control signal in response to one of the at least one positive-going component and the at least one negative-going component first detected to turn on the switch, and to generate a second portion of the second control signal in response to the other of the at least one positive-going component and the at least one negative-going component second detected to turn off the switch.

3. The signal transmission circuit of claim 2, wherein the first portion of the second control signal is a rising portion of the second control signal, and the second portion of the second control signal is a falling portion of the second control signal.

4. The signal transmission circuit of claim 2, wherein when the first control signal is a flag signal, the other of the at least one positive-going component and the at least one negative-going component is generated a predetermined number of consecutive times, and wherein the detection circuit is configured to generate the second control signal to enable the switch to perform a predetermined function.

5. The signal transmission circuit of claim 1, wherein the detection circuit comprises:
   a receiver circuit, coupled to the signal transformer, the receiver circuit configured to receive the at least one positive-going component and the at least one negative-going component to output a first detection signal and a second detection signal, respectively; and
   a processing circuit, coupled to the receiver circuit, wherein when the first detection signal and the second detection signal are outputted one after the other, the processing circuit is configured to generate the second control signal according to the first detection signal and the second detection signal; the second control signal indicating an on-time duration of the switch defined by a time delay between the first detection signal and the second detection signal.

6. The signal transmission circuit of claim 5, wherein the receiver circuit comprises:
   an amplifier circuit, configured to amplify the output signal to generate an amplified signal; and
   a comparison circuit, coupled to the amplifier circuit, the comparison circuit configured to compare the amplified signal with a reference signal to determine if the at least one positive-going component or the at least one negative-going component is received, wherein when a signal level of the amplified signal is greater than a signal level of the reference signal, it is determined that one of the at least one positive-going component and the at least one negative-going component is received; and when the signal level of the amplified signal is less than the signal level of the reference signal, it is determined that the other of the at least one positive-going component and the at least one negative-going component is received.

7. The signal transmission circuit of claim 6, wherein the comparison circuit comprises:
   a first comparator, having a first non-inverting terminal, a first inverting input terminal and a first output terminal, wherein the first non-inverting terminal is coupled to the amplified signal, and the first inverting terminal is coupled to the reference signal; when the signal level of the amplified signal is greater than the signal level of the reference signal, the first output terminal is arranged to output one of the first detection signal and the second detection signal; and
   a second comparator, having a second non-inverting terminal, a second inverting input terminal and a second output terminal, wherein the second non-inverting terminal is coupled to the reference signal, and the second inverting terminal is coupled to the amplified signal; when the signal level of the amplified signal is less than the signal level of the reference signal, the second output terminal is arranged to output the other of the first detection signal and the second detection signal.

8. The signal transmission circuit of claim 5, wherein the receiver circuit outputs one of the first detection signal and the second detection signal to enable a turn-on operation of the switch, and outputs the other of the first detection signal and the second detection signal to enable a turn-off operation of the switch;
   and wherein when the other of the first detection signal and the second detection signal is outputted a predetermined number of consecutive times, the processing circuit is configured to generate the second control signal to enable the switch to perform a predetermined function.

9. The signal transmission circuit of claim 8, wherein the processing circuit comprises:
   an on-time signal generator, coupled to the receiver circuit, wherein the on-time signal generator is configured to set the second control signal to a first signal level in response to the first detection signal, and set the second control signal to a second signal level in response to the second detection signal; and
   a signal decoder, coupled to the receiver circuit, wherein the signal decoder is configured to count a number of times the second detection signal is consecutively outputted; when the number of times the second detection signal is consecutively outputted reaches the predetermined number of consecutive times, the signal decoder is configured to generate the second control signal.

10. The signal transmission circuit of claim 9, wherein the signal decoder comprises:
   a counter circuit, configured to count the number of times the second detection signal is consecutively outputted, and generate a count signal indicating the number of times the second detection signal is consecutively outputted;
a trigger circuit, coupled between the receiver circuit and the counter circuit, the trigger circuit configured to enable the counter circuit according to the second detection signal, and reset the counter circuit according to the first detection signal; and
an output circuit, coupled to the counter circuit, the output circuit configured to receive the count signal to determine if the number of times the second detection signal is consecutively outputted reaches the predetermined number of consecutive times, wherein when the number of times the second detection signal is consecutively outputted reaches the predetermined number of consecutive times, the output circuit is configured to generate the second control signal.

11. The signal transmission circuit of claim 9, wherein when the number of times the second detection signal is consecutively outputted reaches the predetermined number of consecutive times, the signal decoder is further configured to output a fourth control signal indicating the predetermined number of consecutive times; a function type of the predetermined function performed by the switch is determined according to the fourth control signal.

12. The signal transmission circuit of claim 1, wherein the ramp signal comprises a first ramp pulse and a second ramp pulse; the signal transformer is configured to convert the first ramp pulse to generate one of the at least one positive-going component and the at least one negative-going component, and convert the second ramp pulse to generate the other of the at least one positive-going component and the at least one negative-going component.

13. The signal transmission circuit of claim 12, wherein the signal transformer comprises:
a first winding comprising a first end and a second end, wherein the first end of the first winding is arranged to receive the first ramp pulse, and the second end of the first winding is arranged to receive the second ramp pulse; and
a second winding comprising a first end and a second end, wherein the first end of the second winding is arranged to output the output signal, and the second end of the second winding is coupled to a reference voltage.

14. A signal transmission circuit for transmitting control information from a secondary side of a power converter to a primary side of the power converter, the signal transmission circuit comprising:
a transmitter circuit, configured to generate a ramp signal at least according to a first control signal outputted from the secondary side, wherein the first control signal indicates the control information provided for a switch in the primary side;
a signal transformer, coupled to the transmitter circuit, the signal transformer being configured to convert the ramp signal to generate an output signal, wherein the output signal comprises at least one of a positive-going component and a negative-going component to indicate the control information; and
a detection circuit, coupled to the signal transformer, the detection circuit being configured to detect the at least one of the positive-going component and the negative-going component and to generate a second control signal to provide the control information for the switch;
wherein when the control information indicates an on-time duration of the switch, the transmitter circuit is configured to output a first ramp pulse and a second ramp pulse as the ramp signal according to the first control signal; one of the first ramp pulse and the second ramp pulse indicates a turn-on operation of the switch, and the other of the first ramp pulse and the second ramp pulse indicates a turn-off operation of the switch.

15. The signal transmission circuit of claim 14, wherein the transmitter circuit comprises:
an output terminal, arranged to output the first ramp pulse;
a pull-up transistor and a pull-down transistor coupled in series, wherein the output terminal is coupled between the pull-up transistor and the pull-down transistor;
an input signal generator, configured to generate an input signal in response to the first control signal; and
a pre-driver, coupled to the pull-up transistor, the pull-down transistor and the input signal generator, the pre-driver configured to control the pull-up transistor and the pull-down transistor to output a current ramp pulse by turning on the pull-up transistor and the pull-down transistor in sequence according to the input signal, wherein the current ramp pulse is outputted from the output terminal to serve as the first ramp pulse.

16. The signal transmission circuit of claim 14, wherein the on-time duration is determined according to a rising portion and a falling portion of the first control signal; the transmitter circuit is configured to output the first ramp pulse in response to one of the rising portion and the falling portion of the first control signal, and output the second ramp pulse in response to the other of the rising portion and the falling portion of the first control signal.

17. The signal transmission circuit of claim 14, wherein when the control information indicates activation of a predetermined function of the power converter, the transmitter circuit is configured to repeatedly output the other of the first ramp pulse and the second ramp pulse as the ramp signal according to the first control signal.

18. The signal transmission circuit of claim 17, wherein a number of times the other of the first ramp pulse and the second ramp pulse is consecutively outputted is determined according to a function type of the predetermined function.

19. The signal transmission circuit of claim 18, wherein when the transmitter circuit is configured to repeatedly output the other of the first ramp pulse and the second ramp pulse, the signal transformer is configured to repeatedly output one of the positive-going component and the negative-going component; the detection circuit is configured to detect if the one of the positive-going component and the negative-going component is outputted a predetermined number of consecutive times;
the signal transmission circuit further comprises:
a control unit, coupled to the transmitter circuit, the control unit configured to generate the first control signal, and stop generating the first control signal when the detection circuit detects that the one of the positive-going component and the negative-going component is outputted the predetermined number of consecutive times.

20. A control circuit for a power converter, comprising:
a first control unit, coupled to a secondary-side circuit of the power converter, the first control unit configured to generate a first control signal comprising an on signal and a flag signal, the on signal indicating on-time information for a switch of a primary-side circuit of the power converter, the flag signal indicating whether a predetermined function of the power converter is activated;

a signal transmission circuit, coupled to the first control unit, the signal transmission circuit comprising:

a transmitter circuit, configured to generate a ramp signal according to the on signal and the flag signal;

a signal transformer, coupled to the transmitter circuit, the signal transformer being configured to convert the ramp signal to generate an output signal, wherein when the flag signal indicates that the predetermined function is not activated, the transmitter circuit is configured to generate the ramp signal according to the on signal, and the output signal comprises a positive-going component and a negative-going component occurring one after the other;

when the flag signal indicates that the predetermined function is activated, the transmitter circuit is configured to generate the ramp signal according to the flag signal, and the output signal comprises one of the positive-going component and the negative-going component consecutively occurring a plurality of times; and a detection circuit, coupled to the signal transformer, the detection circuit being configured to detect the positive-going component and the negative-going component to generate a second control signal; and a second control unit, coupled between the detection circuit and the switch, the second control unit configured to control the switch according to the second control signal.

21. The control circuit of claim 20, wherein when the flag signal indicates that the predetermined function is activated, the detection circuit is configured to generate the second control signal by detecting a number of times the one of the positive-going component and the negative-going component consecutively occurs; the second control unit is configured to determine a function type of the predetermined function according to the second control signal.

* * * * *